(12) United States Patent
Kubota et al.

(10) Patent No.: US 8,718,843 B2
(45) Date of Patent: May 6, 2014

(54) CONTROL METHOD FOR INDUSTRIAL VEHICLE AND INDUSTRIAL VEHICLE

(75) Inventors: Yutaka Kubota, Nagoya (JP); Tomohiro Akaki, Takasago (JP); Kensuke Futahashi, Takasago (JP)

(73) Assignee: Mitsubishi Nichiyu Forklift Co., Ltd., Kyoto (JP)

( * ) Notice: Subject to any disclaimer, the term of this patent is extended or adjusted under 35 U.S.C. 154(b) by 1181 days.

(21) Appl. No.: 12/292,699

(22) Filed: Nov. 24, 2008

(65) Prior Publication Data
US 2009/0222158 A1 Sep. 3, 2009

(30) Foreign Application Priority Data

Feb. 29, 2008 (JP) ................... 2008-051053

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl.
USPC .......................................................... 701/22

(58) Field of Classification Search
USPC ............ 701/22, 36, 99, 101; 180/65.1, 65.21, 180/65.26, 65.28, 65.29; 320/127–129, 320/132, 135–137, 149; 318/139
See application file for complete search history.

(56) References Cited

U.S. PATENT DOCUMENTS 6,629,027 B2 * 9/2003 Yamaguchi et al. ............ 701/22
7,990,100 B2 * 8/2011 Kubota et al. ................. 320/104
2002/0117997 A1 * 8/2002 Feil et al. ....................... 320/132
2006/0152196 A1 * 7/2006 Matsumoto et al. ........... 320/132
2006/0243260 A1 * 11/2006 Ichijo et al. ................. 123/559.3
2007/0095587 A1 * 5/2007 DuCharme ................... 180/65.3
2007/0161456 A1    7/2007 Kato et al.
2008/0133077 A1 * 6/2008 Akaki et al. ...................... 701/22
2010/0000809 A1 * 1/2010 Nishi et al. .................. 180/65.29

FOREIGN PATENT DOCUMENTS

DE   100 03 271 A1   8/2001
EP     1 720 244 A1  11/2006
JP     2000-313600 A 11/2000
JP     2005-12902 A   1/2005

(Continued)

OTHER PUBLICATIONS

European Search Report dated Feb. 2, 2011.

(Continued)

*Primary Examiner* — Khoi Tran
*Assistant Examiner* — Harry Oh
(74) *Attorney, Agent, or Firm* — Birch, Stewart, Kolasch & Birch, LLP

(57) ABSTRACT

A control method for an industrial vehicle can appropriately set a charge amount for a battery, and an industrial vehicle are provided. The control method includes an estimation step that estimates the charge rate of a battery by calculating the current that is charged to the battery and the current that is discharged from the battery; a charge amount determining step that determines the charge amount of the battery based on the estimated charge rate; a correction amount determining step that determines the charge power that is necessary for motors to generate the determined charge amount as a correction amount for the power that is supplied by the engine; and an addition step that adds the charge power to the supplied power of the engine that has been determined based on the state of the traveling and load-handling.

5 Claims, 16 Drawing Sheets

(56) References Cited

FOREIGN PATENT DOCUMENTS

| | | |
|---|---|---|
| JP | 2005-140080 A | 6/2005 |
| JP | 2005-237178 A | 9/2005 |
| JP | 2007-178215 A | 7/2007 |
| JP | 2008-120158 A | 5/2008 |

OTHER PUBLICATIONS

Japanese Office Action issued in Japanese Patent Application No. 2008-051053 on Oct. 30, 2012.
Japanese Decision of Patent Grant issued in Japanese Patent Application No. 2008-051053 on Jul. 2, 2013.
Japanese Office Action mailed Jul. 31, 2012 and English Translation.

* cited by examiner

CONTROL METHOD FOR INDUSTRIAL VEHICLE AND INDUSTRIAL VEHICLE

BACKGROUND OF THE INVENTION

1. Field of the Invention

The present invention relates to a control method for an industrial vehicle, and to an industrial vehicle.

This application is based on Japanese Patent Application No. 2008-051053, the content of which is incorporated herein by reference.

2. Description of Related Art

Generally, in a hybrid system that combines an engine and a motor, a battery is widely used as a power source (refer, for example, to Japanese Unexamined Patent Application, Publication No. 2000-313600).

Among such batteries, the battery charge rate (below, the battery charge is referred to as the "battery SOC" (State of Charge)) must be controlled in those that are used in an HEV (Hybrid Electric Vehicle), and a variety of methods for controlling the battery SOC in hybrid systems have been proposed (refer, for example, to Japanese Unexamined Patent Application, Publication No. 2005-012902).

Specifically, in the case in which the battery SOC is high, the instantaneous charge capacity of the battery, that is, the amount of electric power by which the battery can be charged instantaneously, decreases. Thus, the battery SOC must be controlled so as to be equal to or less than a first prescribed value so that electric power that is generated during rotational regeneration can always be absorbed.

In contrast, the battery SOC must be controlled so as to be equal to or greater than a second prescribed value so that the battery SOC does not decrease excessively.

Thus, a variety of methods have been proposed for determining the battery SOC, and methods in which the battery SOC is determined by using the relationship between the battery voltage and the battery SOC are known.

In the case in which the battery SOC is determined by using these methods, there is a problem in that the battery voltage fluctuates significantly while charging and while discharging, and thus determining an accurate SOC is not possible.

Furthermore, although the battery SOC can be determined by using the relationship between the battery voltage and the battery SOC, a battery voltage that fluctuates significantly takes time to return to the original voltage, as described above, and thus, there is a problem in that determining the correct battery SOC takes time.

In contrast, the battery SOC must be controlled so as to maintain predefined values while supplying to a vehicle the power that is necessary for travel operations and load-handling operations, and thus, there is a problem in that power control becomes necessary. This power control determines, depending on the operational state of the vehicle, whether or not the battery can be charged and determines the amount of the charge.

BRIEF SUMMARY OF THE INVENTION

In order to solve the problems described above, it is an object of the present invention to provide a control method for an industrial vehicle that enables the appropriate setting of the charge amount for a battery, and an industrial vehicle.

In order to attain the object described above, the present invention provides the solutions described below.

A control method of the present invention, for an industrial vehicle that is provided with an engine that supplies power for at least one of traveling and load-handling, motors that supply power for at least one of traveling and load-handling and carry out power generation, and a battery that supplies power to the motors or is charged by power that has been generated by the motors, includes: an estimation step that estimates the charge rate of the battery by quantifying the current that has been charged to the battery and the current that has been discharged from the battery; a charge amount determining step that determines the charge amount for the battery based on the estimated charge rate; a correction amount determining step that determines the charge power that is necessary in order for the motor to generate the determined charge amount as a correction amount for the power that is supplied by the engine; and an addition step that adds this charge power to the power that is supplied by the engine, the supplied power being determined based on the travel state and the load-handling state.

According to the present invention, the charge amount for the battery is appropriately set by calculating the charge power that is necessary for supplying the determined charge amount and adding the required power to the power that is supplied by the engine.

Furthermore, the charge amount for the battery is appropriately set because the charge amount for the battery is determined based on the charge rate of the battery, which has been obtained by quantifying the current that has been charged to the battery and the current that has been discharged from the battery.

A control method of the present invention, for an industrial vehicle that is provided with an engine that supplies power for at least one of traveling and load-handling, motors that supply power to at least one of traveling and load-handling and carry out power generation, and a battery that supplies power to the motors or that is charged by power that is generated by the motors, includes: an estimation step in which the charge rate of the battery is estimated by quantifying the current that has been charged to the battery or the current that has been discharged from the battery; and a switching step that switches between a charging mode that prioritizes the charging of the battery and a discharging mode that prioritizes the power supply to at least one of traveling and load-handling based on the state of the travel and the load-handling.

According to the present invention, the charge amount for the battery, which depends on an operating state such as a travel state or a load-handling state, is appropriately set by switching between a charging mode and a discharging mode based on the state of the traveling and the load-handling of the industrial vehicle.

The control method of the present invention, for an industrial vehicle that is provided with an engine that supplies power for at least one of traveling and load-handling, motors that supply power to at least one of traveling and load-handling and carry out power generation, and a battery that supplies power to the motors or is charged by power that is generated by the motors, includes: an estimation step that estimates the charge rate of the battery by quantifying the current that has been charged to the battery or the current that has been discharged from the battery; a charge amount determining step that determines the charge amount for the battery based on the estimated charge rate; a charge correction amount calculating step that calculates a charge correction amount for the charge amount based on the travel and the load-handling states; and an adjustment step that adjusts the charge amount based on the operating time, which is the result of summing the amount of time during which one or both of traveling or load-handling has been carried out, and a summed value, which is the result of summing the charge correction amounts.

According to the present invention, the charge amount for the battery can be appropriately set by adjusting the charge amount based on the summed values of the operating time and the charge correction amounts. Specifically, the frequency of the charging of the battery is estimated by finding the charge correction amount per unit time based on the operating time and the charge summed value. Thereby, the charge amount for the battery is appropriately set by adjusting the charge amount of the battery according to the estimated charge frequency.

The industrial vehicle of the present invention may be structured so as to be provided with an engine that supplies power for at least one of traveling and load-handling, motors that supply power for at least one of traveling and load-handling and that carry out power generation, and a battery that supplies power to the motors or that is charged by power that is generated by the motors, and a control section that carries out the control method of the present invention.

According to this structure, the charge amount for the battery of an industrial vehicle can be appropriately set by carrying out the control method of the present invention.

According to the control method for an industrial vehicle and the industrial vehicle of the present invention, effects are exhibited in which the charge amount for the battery can be appropriately set by calculating the charge power that is necessary for supplying the determined charge amount, and adding the power that is necessary for charging to the power that is supplied by the engine.

According to the control method for an industrial vehicle and the industrial vehicle of the present invention, effects are exhibited in which the charge amount for the battery, which depends on the operating state such as the travel state and the load-handling state, can be appropriately set by switching between a charging mode and a discharging mode based on the traveling and load-handling states of the industrial vehicle.

According to the control method for an industrial vehicle and the industrial vehicle of the present invention, effects are exhibited in which the charge amount for the battery can be appropriately set by adjusting the charge amount based on the summed values of the operating time and the charge correction amounts. In particular, because the battery efficiency is reduced when the charge amount for the battery is large, a reduction in the battery efficiency can be prevented by preventing an excessively large charge amount by appropriately setting the charge amount for the battery.

DETAILED DESCRIPTION OF THE INVENTION

First Embodiment

Below, a forklift according to a first embodiment of the present invention will be explained with reference to FIG. 1 to FIG. 16.

Figure 1:
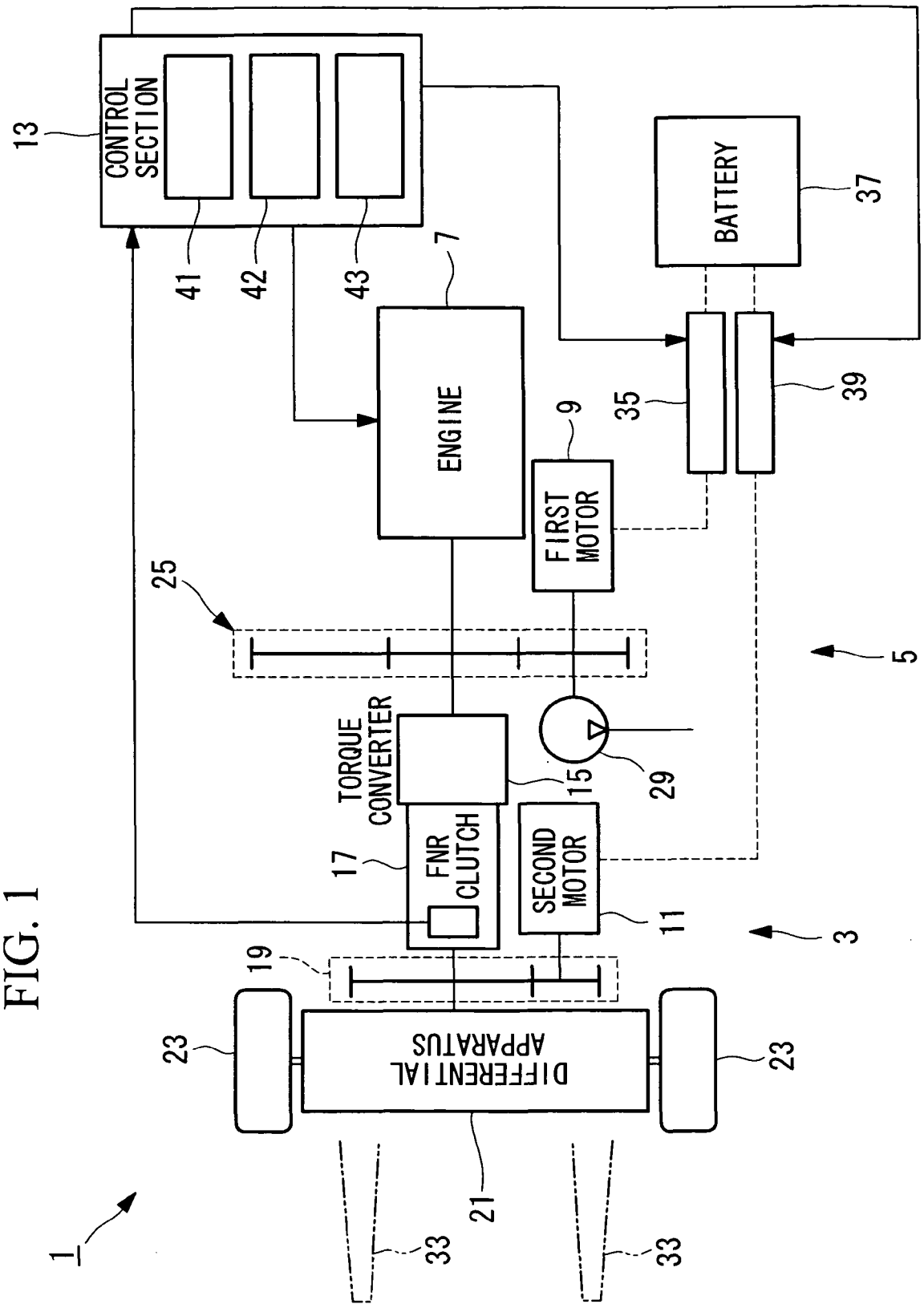
FIG. 1 is a drawing that shows the power transmission system of a forklift according to a first embodiment of the present invention.

FIG. 1 is a drawing that shows the power train system of the forklift according to the present invention.

In the present embodiment, an application to a parallel forklift will be explained, the parallel forklift being a hybrid forklift (referred to hereinbelow as a "forklift") that uses an engine and motors as power sources, and uses not only the motor power but also the engine power for traveling and load-handling.

As shown in FIG. 1, the forklift (industrial vehicle) 1 is provided with a travel section 3 that carries out travel, a load-handling section 5 that carries out load-handling, an engine 7 and a first motor (motor) 9 that supply power to at least one of the travel section 3 and the load-handling section 5, a second motor (motor) 11 that supplies power to the travel section 3, and a control section 13 that calculates the power that is necessary for the travel section 3 and the load-handling section 5, and controls the power distribution of the engine 7, the first motor 9, and the second motor 11.

The travel section 3 is provided with a torque converter 15 that converts the torque of the power that has been transferred from a first gear train 25 to a predetermined value, an FNR clutch 17, which is a clutch section, that controls the power transfer from the torque converter 15 to a second gear train 19, a second gear train 19 that transfers power that has been transferred from the FNR clutch 17 and the power of the second motor 11 to a differential apparatus 21, a differential apparatus 21 that transfers power to front wheels 23, and front wheels 23 that cause the forklift 1 to travel by using the power that has been transferred.

The FNR clutch 17 carries out control when power is transferred from the torque converter 15 to the second gear train 19 such that the rotational direction of the power is transferred without being changed, thereby causing the forklift 1 to travel forward (F), or the rotational direction is reversed, thereby causing the forklift 1 to travel in reverse (R), or the transfer of power is interrupted (neutral (N)).

The FNR clutch 17 is controlled by the operator of the forklift 1 operating a clutch pedal (not illustrated), and the state of the FNR clutch 17 is input to a power distribution calculating section 43.

The differential apparatus 21 is an apparatus that includes differential gears and the like, converts the rotational direction of the power that has been transferred from the second gear train, and absorbs rotational differences between the left and right front wheels 23.

The load-handling section 5 is provided with a first gear train 25 that transfers the power of the engine 7 and the first motor 9 to the torque converter 15 and a hydraulic pump 29, a hydraulic pump 29 that generates hydraulic pressure by using the transferred power, and forks 33, which are tines that are used during load-handling.

A hydraulic pump 29 drives a hydraulic cylinder (not illustrated) by the hydraulic pressure that has been generated, and raises the forks 33.

The engine 7 includes an output shaft that is connected to the first gear train 25. In addition, the engine power command, which controls the power that is supplied by the engine, is input to the engine 7 from the power distribution calculating section 43.

The first motor 9 includes an output shaft that is connected to the first gear train 25. In addition, the first motor 9 is supplied with current from a battery 37 via a first inverter 35.

The first inverter 35 converts the direct current that is supplied from the battery 37 to alternating current, and controls the power that is generated by the first motor 9. A first motor power command, which controls the power that is supplied by the first motor 9, is input to the first inverter 35 from the power distribution calculating section 43.

The second motor 11 includes an output shaft that is connected to the second gear train 19. In addition, the second motor 11 is supplied with a current from the battery 37 via the second inverter 39.

The second inverter 39 converts the direct current that is supplied from the battery 37 to alternating current, and controls the power that is generated by the second motor 11. A second motor power command, which controls the power that is supplied by the second motor 11, is input from the power distribution calculating section 43 to the second inverter 39.

The control section 13 is provided with a required power calculating section 41 that calculates the traveling power (power for travel) $P_R$ that is supplied to the travel section 3 and the load-handling power (power for handling a load) $P_L$ that is supplied to the load-handling section 5, a battery SOC calculating section 42 that calculates the battery SOC, and the power distribution calculating section 43 that calculates the distribution of the engine power $P_{EG}$, the first motor power $P_{M1}$, and the second motor power $P_{M2}$.

Based on the calculated distribution of the power, the power distribution calculating section 43 outputs an engine power command that is input to the engine 7, a first motor power command that is input to the first motor 9, and a second motor power command that is input to the second motor 11.

Next, the settings of the power distribution and the battery charge amount in the forklift having the structure described above will be explained.

Figure 2:
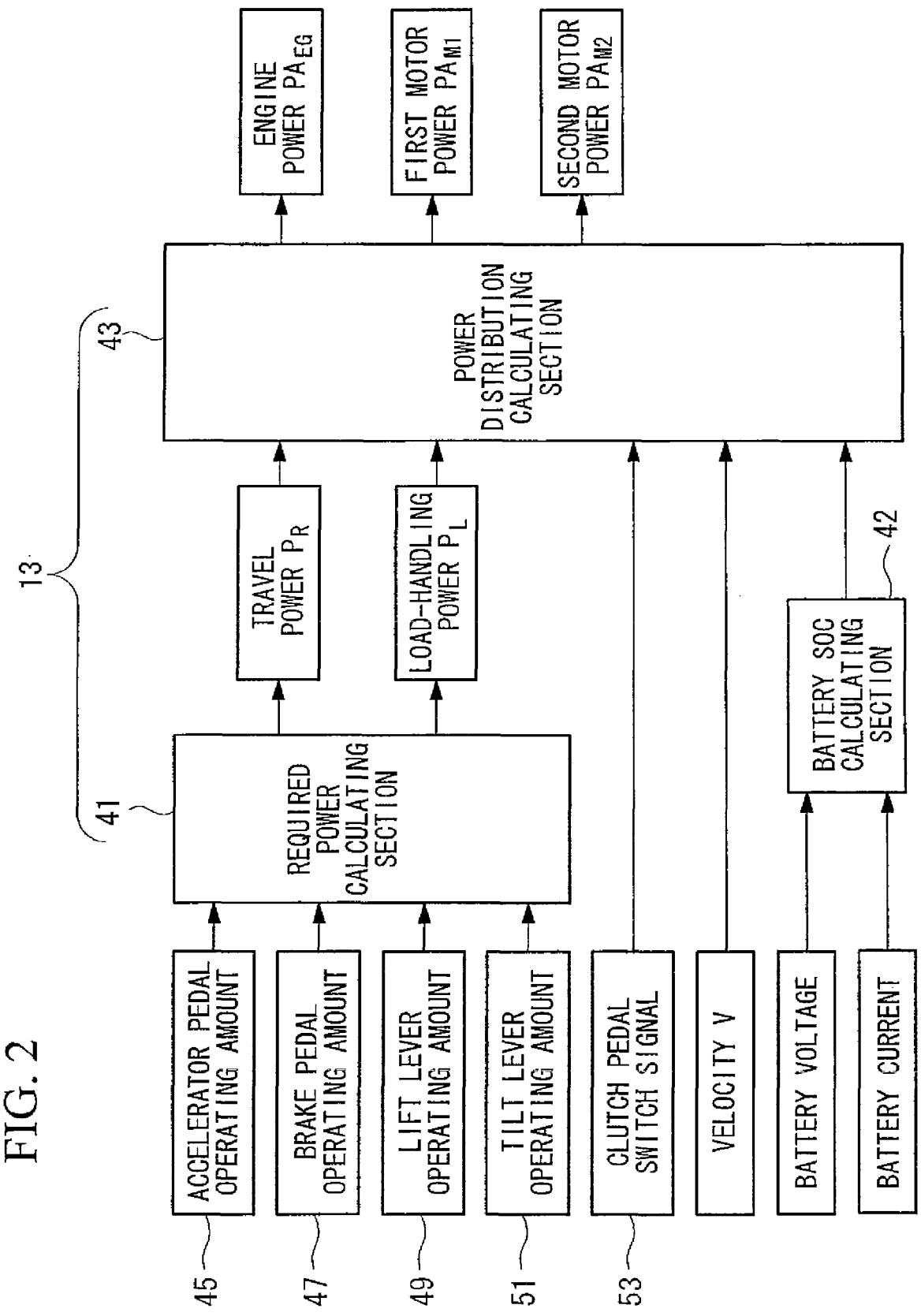
FIG. 2 is a block diagram for explaining the power distribution method in the control section of FIG. 1.

FIG. 2 is a block diagram for explaining the power distribution method that is carried out by the control section in FIG. 1.

As shown in FIG. 2, an operation amount 45 of the accelerator pedal, an operation amount 47 of the brake pedal, an operation amount 49 of the lift lever, and an operation amount 51 of the tilt lever, which all result from operations by the operator, are input to the required power calculating section 41 of the control section 13. The required power calculating section 41 calculates the travel power $P_R$ that is necessary for travel and the load-handling power $P_L$ that is necessary for load-handling based on these operation amounts that have been input to the required power calculating section 41 (the required power calculating step).

For example, the travel amount $P_R$ that is necessary for travel can be found based on the operation amount 45 of the accelerator pedal and the operation amount 47 of the brake pedal and the like, and the load-handling power $P_L$ that is necessary for load-handling can be found based on the operation amount 49 of the lift lever and the operation amount 51 of the tilt lever and the like.

The calculated travel power $P_R$ and the load-handling power $P_L$ are input to the power distribution calculating section 43, and then the clutch pedal switch signal 53, which represents the state of the FNR clutch 17, is input to the power distribution calculating section 43.

A power distribution table section 61 (refer to FIG. 7) in the power distribution calculating section 43 selects one set of table data from among a plurality of sets of table data, which have been stored in advance, based on the clutch pedal switch signal 53, and calculates the distribution of the engine power $P_{EG}$, the first motor power $P_{M1}$, and the second motor power $P_{M2}$ based on the travel power $P_R$ and load-handling power $P_L$ that have been calculated so as to satisfy the following equation 1 (the power distribution calculating step):

$$P_R + P_L = P_{EG} + P_{M1} + P_{M2} \qquad 1$$

Here, the engine power $P_{EG}$, the first motor power $P_{M1}$, and the second motor power $P_{M2}$ are sums of the torque and the speed, and thus the above equation 1 can also be represented as the following equation 2:

$$P_R + P_L = T_{EG} \times \omega_{EG} + T_{M1} \times \omega_{M1} + T_{M2} \times \omega_{M2} \qquad 2$$

Here, $T_{EG}$ is the engine torque, and $\omega_{EG}$ is the engine speed. $T_{M1}$ is the first motor torque and $\omega_{M1}$ is the first motor speed. $T_{M2}$ is the second motor torque and $\omega_{M2}$ is the second motor speed.

As shown in equation 2 above, six variables must be controlled in order to determine the torque so as to satisfy the power balance in a distribution based on the torque, and thus control becomes difficult.

Thus, in the present embodiment, as shown in equation 1, the power balance is satisfied by controlling three variables: the engine power $P_{EG}$, the first motor power $P_{M1}$, and the second motor power $P_{M2}$.

These will be explained in detail below.

Figure 3:
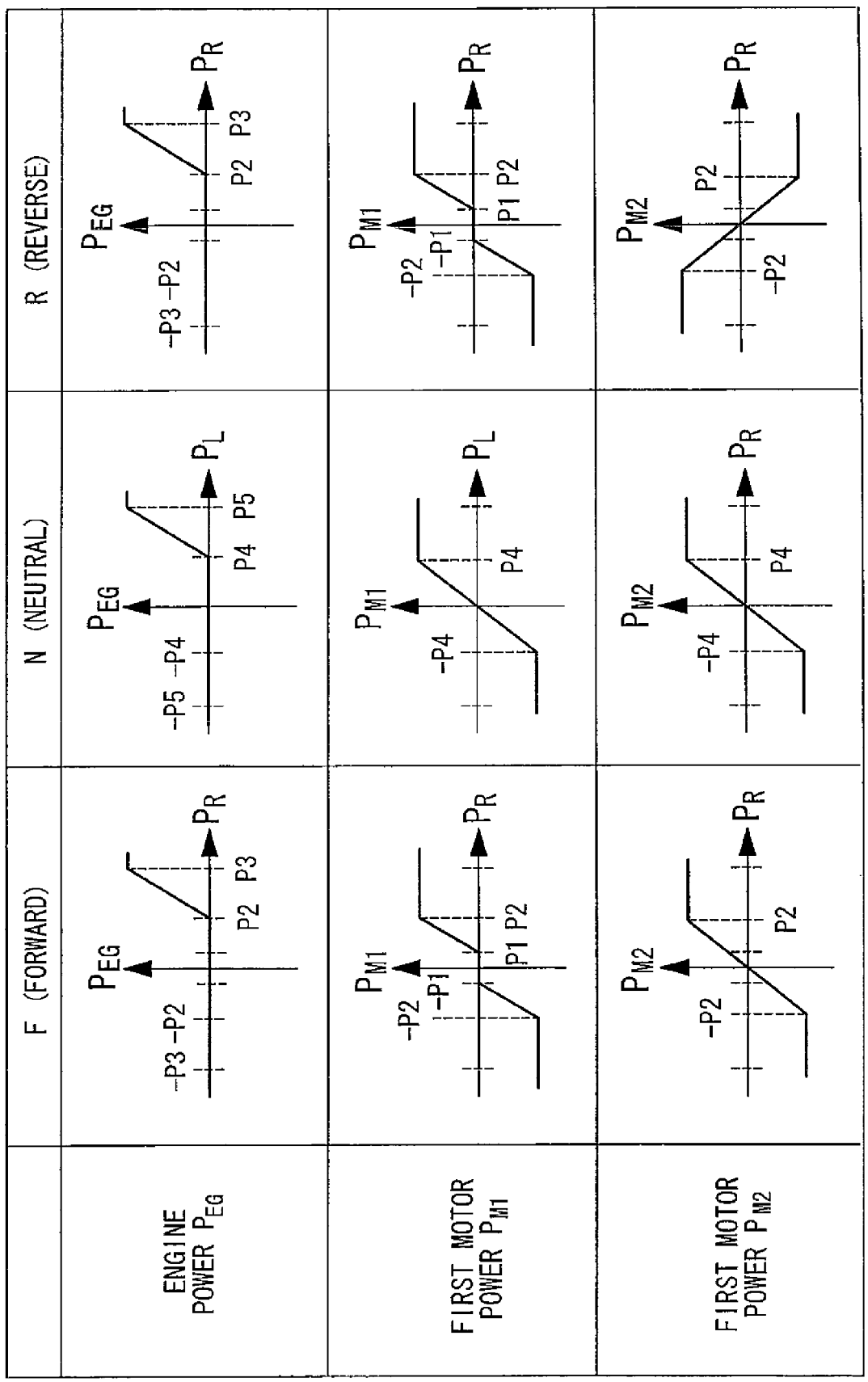
FIG. 3 is a drawing for explaining the plurality of table data that has been stored in the power distribution calculating section in FIG. 2.

FIG. 3 is a drawing for explaining the plurality of sets of table data, which are stored in the power distribution calculating section in FIG. 2.

As shown in FIG. 3, the plurality of sets of table data, which are stored in the power distribution calculating section 43, is produced by distinguishing cases according to the clutch pedal switch signal 53 (F (forward), N (neutral), and R (reverse)). The power distribution calculating section 43 selects the table data corresponding to F, the table data corresponding to N, or the table data corresponding to R based on the clutch pedal switch signal 53.

Note that in each set of table data, the distribution of the engine power $P_{EG}$, the first motor power $P_{M1}$, and the second motor power $P_{M2}$ are specified with respect to the input travel power $P_R$ and the load-handling power $P_L$, and the relationships in the above equation 1 are satisfied.

Subsequently, the power distribution calculating section 43 calculates the distribution of the engine power $P_{EG}$, the first motor power $P_{M1}$, and the second motor power $P_{M2}$ based on the set of the table data that has been selected.

For example, in the case in which the sets of the table data that correspond to F or R have been selected, the engine power $P_{EG}$, the first motor power $P_{M1}$, and the second motor power $P_{M2}$ are all calculated based on the travel power $P_R$. Power distribution is carried out such that during the interval in which the travel power $P_R$ changes from 0 to a first predetermined power $P_1$, the second motor power $P_{M2}$ is supplied singly to the travel section 3 so as to be proportional to the travel power $P_R$, and during the interval in which the travel power $P_R$ changes from the first predetermined power $P_1$ to a second predetermined power $P_2$, the first motor power $P_{M1}$ and the second motor power $P_{M2}$ are supplied to the travel section 3 so as to be proportional to the travel power $P_R$.

In addition, power distribution is carried out during the interval in which the travel power $P_R$ changes from the second predetermined power $P_2$ to a third predetermined power $P_3$ such that the first motor power $P_{M1}$ and the second motor power $P_{M2}$ are supplied so as to remain constant, and simultaneously, the engine power $P_{EG}$ is supplied to the travel section 3 so as to be proportional to the travel power $P_R$. In the case in which the travel power $P_R$ becomes greater than the third predetermined power $P_3$, power distribution is carried out such that the engine power $P_{EG}$, the first motor power $P_{M1}$, and the second motor power $P_{M2}$ are supplied to the travel section 3 so as to remain constant.

Note that in the case in which the travel power $P_R$ is a negative value, as shown in FIG. 3, the distribution of the engine power $P_{EG}$ is always 0 because the engine 7 cannot generate a negative power.

In addition, the distribution of the first motor power $P_{M1}$ and the second motor power $P_{M2}$ are identical to those described above.

Specifically, power distribution is carried out such that during the interval in which the travel power $P_R$ changes from 0 to a negative first predetermined power $-P_1$, the second motor power $P_{M2}$ is supplied singly to the travel section 3 so as to be proportional to the travel power $P_R$, and during the interval in which the travel power $P_R$ changes from the negative first predetermined power $-P_1$ to a negative second predetermined power $-P_2$, the first motor power $P_{M1}$ and the second motor power $P_{M2}$ are supplied to the travel section 3 so as to be proportional to the travel power $P_R$. Power distribution is carried out such that during the interval in which the travel power $P_R$ changes from the negative second predetermined power $-P_2$ to a negative third predetermined power $-P_3$, the first motor power $P_{M1}$ and the second motor power $P_{M2}$ are supplied so as to remain constant.

Note that in the sets of table data that correspond to R, the reason that only the second motor power $P_{M2}$ points downward toward the right in the graph is that power is transferred to the front wheels 23 such that only the second motor power $P_{M2}$ is not transferred through the FNR clutch 17.

In addition, in the case in which the sets of table data that correspond to N are chosen, the engine power $P_{EG}$ and the first motor power $P_{M1}$ are calculated based on the load-handling power $P_L$, and the second motor power $P_{M2}$ is calculated based on the travel power $P_R$.

For the engine power $P_{EG}$ and the first motor power $P_{M1}$, power distribution is carried out such that during the interval in which the load-handling power $P_L$ changes from 0 to a fourth predetermined power $P_4$, the first motor power $P_{M1}$ is supplied singly to the load-handling section 5 so as to be proportional to the load-handling power $P_L$, and during the interval in which the load-handling power $P_L$ changes from the fourth predetermined power $P_4$ to a fifth predetermined power $P_5$, the first motor power $P_{M1}$ is supplied to the load-handling section 5 so as to remain constant, and simultaneously, the engine power $P_{EG}$ is supplied to the load-handling section 5 so as to be proportional to the load-handling power $P_L$. In the case in which the load-handling power $P_L$ becomes greater than the fifth predetermined power $P_5$, power distribution is carried out such that the engine power $P_{EG}$ and the first motor power $P_{M1}$ are supplied to the load-handling section 5 so as to remain constant.

In contrast, power distribution is carried out such that during the interval in which the travel power $P_R$ changes from 0 to a fourth predetermined power $P_4$, the second motor power $P_{M2}$ is supplied to the travel section 3 so as to be proportional to the travel power $P_R$, and in the case in which travel power $P_R$ has become greater than the fourth predetermined power $P_4$, the second motor power $P_{M2}$ is supplied to the travel section 3 so as to remain constant.

The power distribution calculating section 43 outputs the engine power command, the first motor power command, and the second motor power command respectively to the engine 7, the first inverter 35, and the second inverter 39 based on the engine power $P_{EG}$, the first motor power $P_{M1}$, and the second motor power $P_{M2}$, which have been calculated as described above.

Note that the table data by which the distribution of the engine power $P_{EG}$, the first motor power $P_{M1}$, and the second motor power $P_{M2}$ are specified may realize the power distribution as shown in FIG. 3, or may realize an alternative power distribution. The power distribution is not limited in particular.

Figure 4:
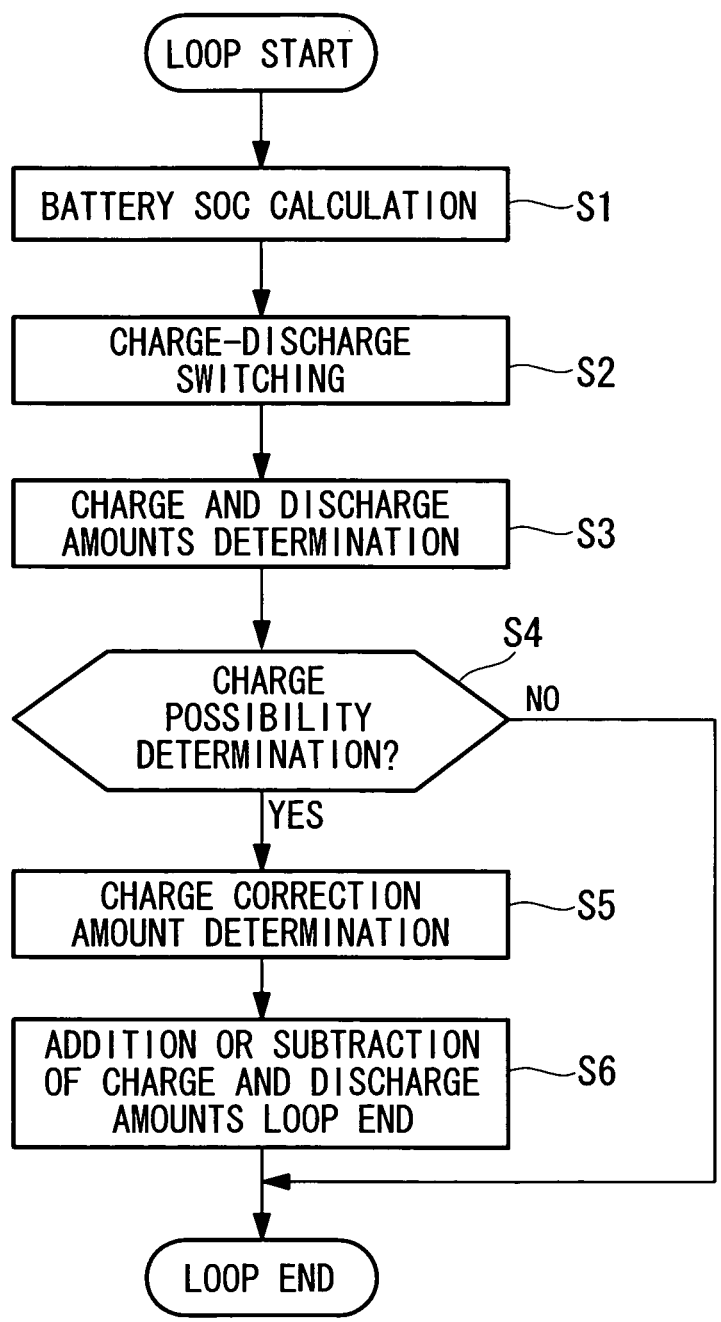
FIG. 4 is a flowchart for explaining the method of setting the charge amount of the battery.

FIG. 4 is a flowchart for explaining the method for setting the charge amount of the battery.

As shown in FIG. 2, the battery voltage and the battery current are input to the battery SOC calculating section 42 of the control section 13, where the battery voltage is the voltage value of the battery 37 and the battery current is the value of the charge and discharge currents. The charge and discharge currents are the current that is discharged from the battery 37 and the current that is charged to the battery 37.

As shown in FIG. 4, the battery SOC calculating section 42 estimates the battery SOC by calculating a battery SOC, which is the SOC of the battery 37, that is based on the battery voltage and the battery current that have been input (step S1 (the estimation step)).

Figure 5:
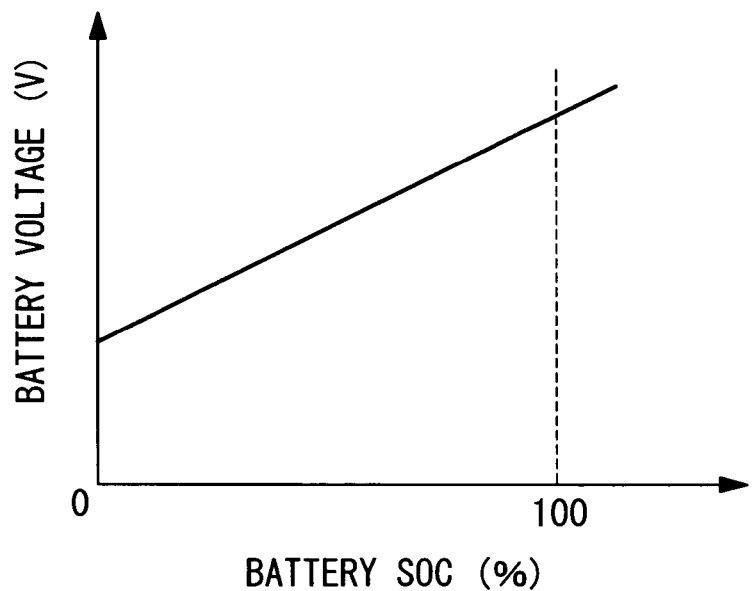
FIG. 5 is a graph for explaining the relationship between the battery SOC and the battery voltage in the battery in FIG. 1.

FIG. 5 is a graph for explaining the relationship between the battery SOC and the battery voltage in the battery in FIG. 1.

Specifically, in the case in which there is no charging or discharging of the battery 37 and the battery voltage is stable, the battery SOC calculating section 42 estimates the battery SOC by using the estimated battery voltage based on the table (graph) that is shown in FIG. 5.

In addition, during the interval in which the charging or discharging of the battery 37 has started and the value of the battery voltage is fluctuating, as shown by the following equation 3, the battery SOC calculating section 42 calculates the proportion (%) of the summed value AH of the charge current with respect to the maximum capacity AHmax of the battery 37, and adds the result to the battery SOC that has been estimated as described above.

$$SOC = ((AH/AH\max) \times 100) + SOCint \qquad 3$$

Here, SOCint is the battery SOC that has been found based on the relationships that are shown in FIG. 3. Furthermore, in the case in which the battery 37 is being charged, the summed value AH has a positive value, and in the case in which the battery 37 being discharged, the summed value AH has a negative value.

Figure 6:
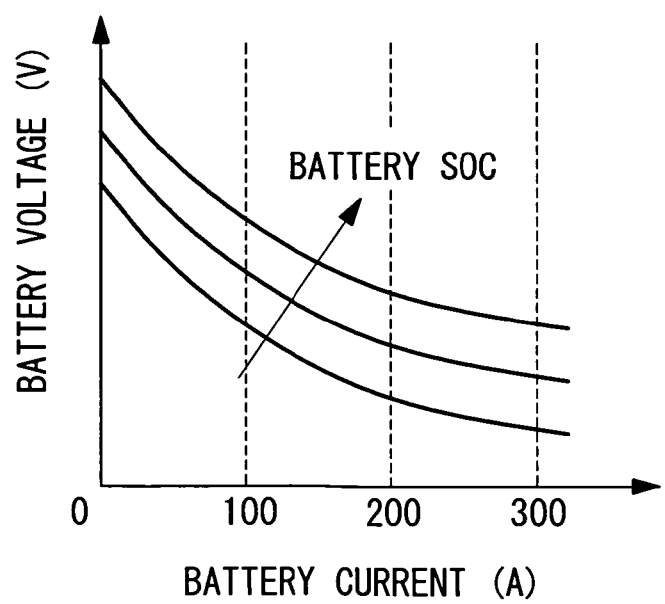
FIG. 6 is a graph for explaining the relationship between the battery SOC, the battery current, and the battery voltage in the battery in FIG. 1.

FIG. 6 is a graph for explaining the relationship between the battery SOC, the battery current, and the battery voltage of the battery in FIG. 1.

Subsequently, the charging and discharging of the battery 37 continues for a predetermined time at a constant current, and when the battery voltage has stabilized, the battery SOC calculating section 42 estimates the battery SOC based on the table (graph) that is shown in FIG. 6 by using the battery SOC that have been calculated, the battery current, and the battery voltage.

Losses that are generated during the charging and discharging of the battery 37 and errors in the sensors or the detectors that detect the current are not included in the battery SOC that has been calculated based on equation 3, and thus the battery SOC calculating section 42 corrects the errors due these factors by estimating the battery SOC by using the tables that are shown in FIG. 5 and FIG. 6.

The travel power $P_R$ and the load-handling power $P_L$, which have been calculated by the required power calculating section 41, the clutch pedal switch signal 53, the velocity V of the forklift 1, and the battery SOC, which has been calculated by the battery SOC calculating section 42, are input to the power distribution calculating section 43.

The engine power $P_{EG}$, the first motor power $P_{M1}$, and the second motor power $P_{M2}$ are determined by the power distribution table section 61 that has been described above, and at the same time, the power distribution calculating section 43 sets the charge amount for the battery 37 and determines the correction amount for the engine power $P_{EG}$ and the first motor power $P_{M1}$.

Figure 7:
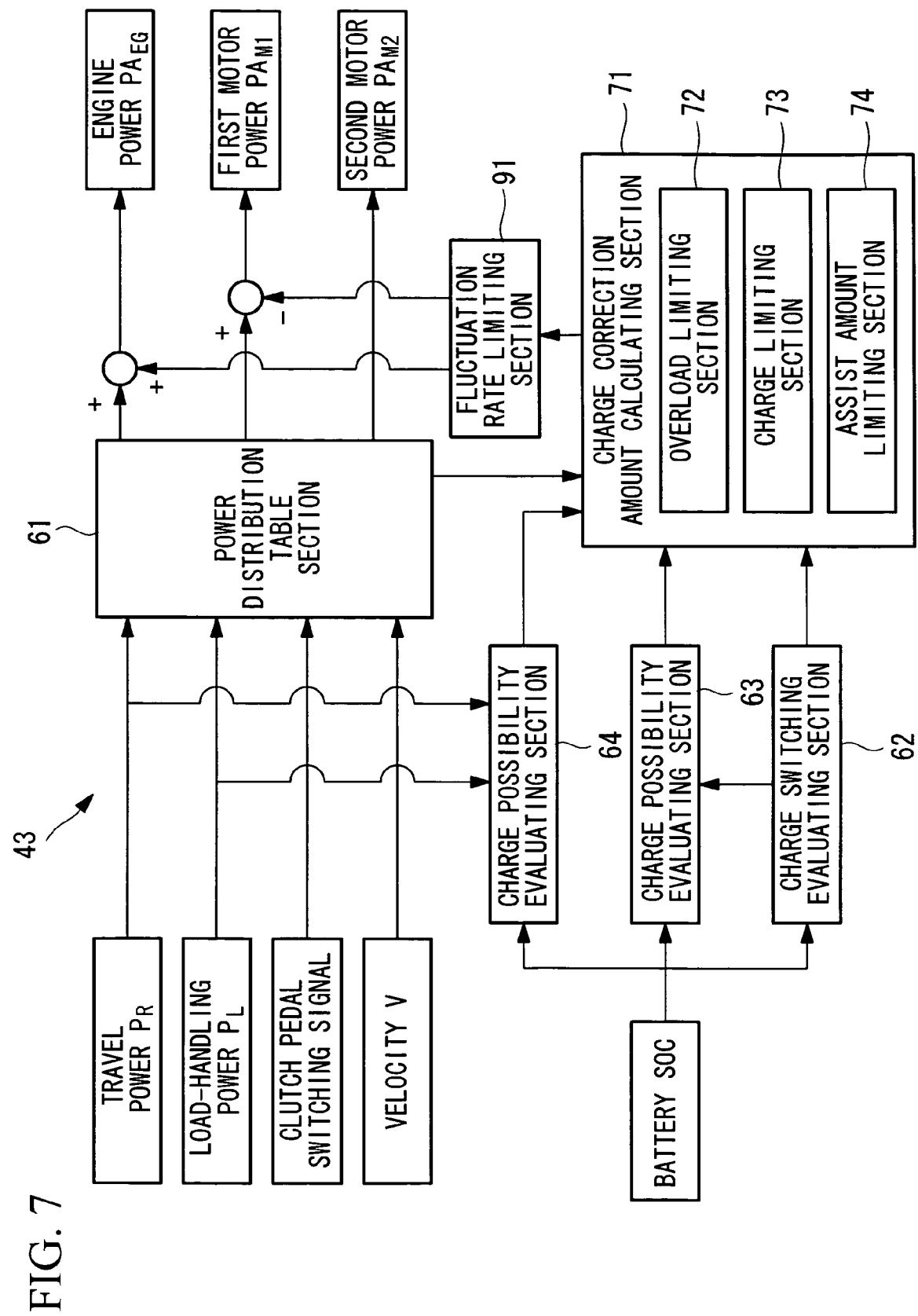
FIG. 7 is a block diagram for explaining the method of setting the charge amount of the battery in the power distribution calculating section in FIG. 2.

FIG. 7 is a block diagram for explaining the method for setting the charge amount for the battery in the power distribution calculating section in FIG. 2.

As shown in FIG. 7, the battery SOC that has been input to the power distribution calculating section 43 is input to the charge switching evaluating section 62, which carries out the evaluation of switching between a charging mode and a discharging mode, the charge amount determining section 63, which evaluates the charge amount for the battery 37, and the charge possibility evaluating section 64, which evaluates whether charging is possible based on the operating condition of the forklift 1.

Figure 8:
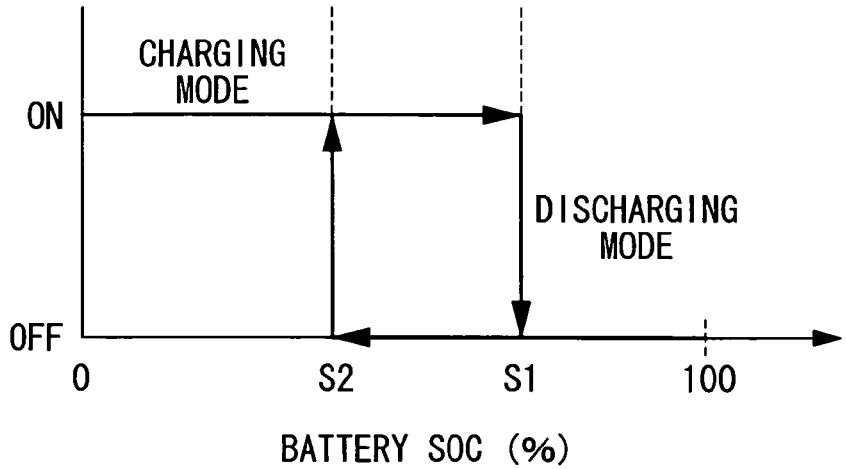
FIG. 8 is a graph for explaining the switching between the charging mode and the discharging mode in the charge switching determining unit in FIG. 7.

FIG. 8 is a graph for explaining the switching between the charging mode and the discharging mode in the charge switching evaluating section in FIG. 7.

As shown in FIG. 4, when the battery SOC is input to the charge switching evaluating section 62, the evaluation of whether to switch between charging and discharging is carried out (step S2 (the switching step)).

As shown in FIG. 8, in the charge switching evaluating section 62, the switching between the charging mode and the discharging mode is determined based on the battery SOC value, and as shown in FIG. 8, the charge switching evaluating section 62 outputs a signal ON=1 and a signal OFF=0 to the charge amount determining section 63, where the signal ON=1 indicates that the charging mode has been selected and the signal OFF=0 indicates that the discharging mode has been selected.

The switching between the charging mode and the discharging mode is subject to hysterisis. Specifically, in the case in which the battery SOC is increasing, the charging mode continues in a range in which the battery SOC changes from 0% to S1(%), and when the battery SOC has exceeded S1, the mode is switched to the discharging mode.

In contrast, in the case in which the battery SOC is decreasing, the discharging mode continues in a range in which the battery SOC changes from 100% to S2(%), and when the battery SOC falls below S2(%), the mode is switched to the charging mode.

Here, the charging mode denotes control in which the first motor 9 carries out power generation by using the power of the engine 7 to charge the battery 37. In contrast, the discharging mode denotes control in which the first motor 9 does not carry out power generation by using the power of the engine 7, or in other words, control in which discharging and charging can be carried out at the same time. Thus, in the discharging mode, power generation is carried out by power regeneration using the first motor 9 and the second motor 11, and the charging of the generated electrical power to the battery 37 is also carried out.

The charging of the battery 37 is divided into (A) a charging from the first motor 9 due to the power of the engine 7 (hereinbelow, referred to as the "charging by the engine") and (B) a charging from the second motor 11 due to the recovery of the regenerated energy of the brakes (hereinbelow, referred to as the "charging by regeneration").

During the charging mode, both (A) the charging by the engine and (B) the charging by regeneration are carried out. In contrast, during the discharging mode, only (B) the charging by regeneration is carried out. That is, the charging (B) by regeneration is carried out in both the charging mode and the discharging mode.

The discharge from the battery 37 is carried out in both the charging mode and the discharging mode in the case in which the assistance of the motor is required.

Figure 9:
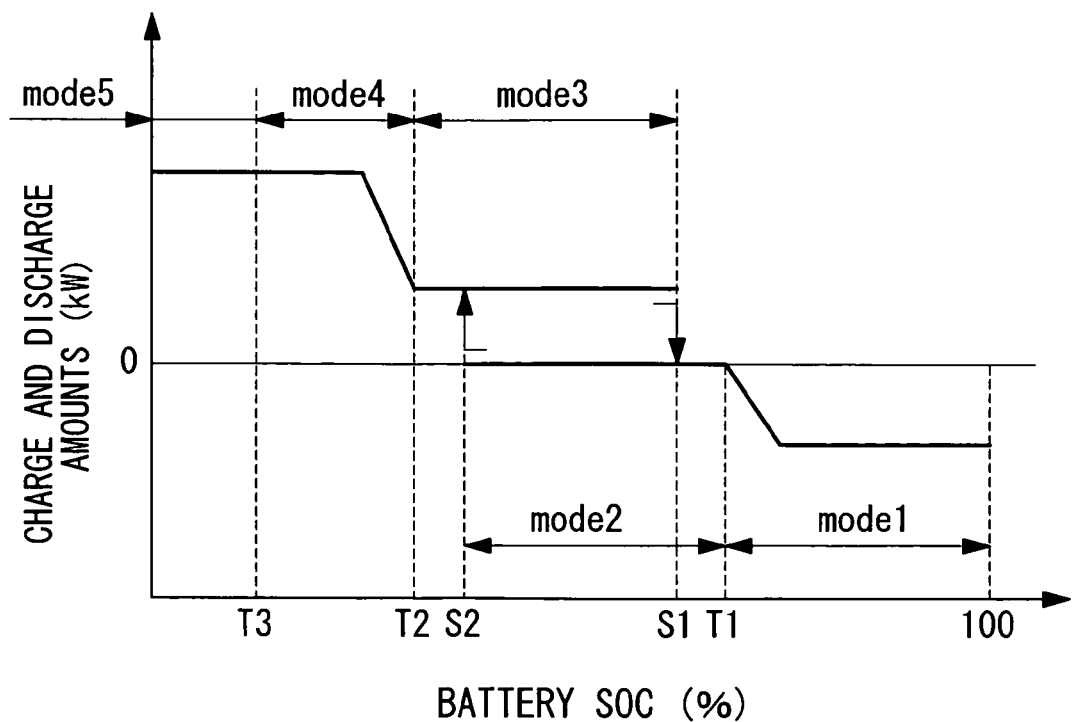
FIG. 9 is a graph for explaining the determination method for the charge and discharge amounts in the charge amount determining section in FIG. 7.

FIG. 9 is a graph for explaining the method for determining the charge and discharge amounts in the charge amount determining section in FIG. 7.

As shown in FIG. 4, when the determination is made to switch between the charging mode and the discharging mode, the charge and discharge amounts for the battery 37 are determined (step S3 (the charge amount determining step)).

As shown in FIG. 7, the battery SOC and the ON signal or the OFF signal from the charge switching evaluating section 62 are input to the charge amount determining section 63. The charge amount determining section 63 evaluates the charge and discharge amounts for the battery 37 based on the battery SOC that has been input, the ON signal and the OFF signal, and the table (graph) that is shown in FIG. 9. The discharge amount that has been determined is output from the charge amount determining section 63 to the charge correction amount calculating section 71.

Here, on the ordinate of the table that is shown in FIG. 9, the positive area (the area above 0) shows the charge amount, and the negative area (the area below 0) shows the discharge amount.

When the charge and discharge amounts for the battery 37 are determined, as shown in FIG. 4, the possibility of charging the battery 37 is determined (step S4).

As shown in FIG. 7, the travel power $P_R$, the load-handling power $P_L$, and the battery SOC are input to the charge possibility evaluating section 64. The charge possibility evaluating section 64 evaluates whether or not to carry out charging by the first motor 9 using the power of the engine 7 based on the travel power $P_R$, the load-handling power $P_L$, and the battery SOC that have been input. Similar to the discharge amounts that have been determined, the result of the determination of the charge possibility evaluating section 64 is output to the charge correction amount calculating section 71.

The discharging mode and the charging mode are divided, as will be explained below, according the charge and discharge amounts that have been determined by the charge amount determining section 63 and the evaluation of whether charging is possible by the charge possibility evaluating section 64, which has been described above.

Specifically, the discharging mode is divided into a mode 1 and a mode 2. In mode 1, charging is not carried out by the engine, and the power that the engine 7 should output normally (i.e., the engine power that takes fuel economy into account) is decreased and the output of the first motor 9 is increased in proportion to the power distribution of the first motor 9 and the engine 7 that is in line with the power distribution table section 61 in FIG. 7, which has been described above. In mode 2, the charging by the engine is not carried out, and the power distribution of the first motor 9 and the engine 7 is maintained in line with the power distribution table section 61 in FIG. 7, which has been described above.

That is, mode 1 and mode 2 are identical with respect to the points that charging is not carried out by the engine and that charging is carried out by regeneration, and differ with respect to the point as to whether or not discharging is carried out actively by increasing the output of the first motor 9 to decrease the SOC of the battery 37.

The charging mode is divided into a mode 3-1, a mode 3-2, and a mode 3-3, in which charging is carried out by the engine by prioritizing the action of the forklift 1, and further into a mode 4-1 and a mode 4-2, in which charging by the engine is prioritized, and a mode 5, in which emergency charging is carried out.

Mode 1 includes control that is carried out in the case in which the battery SOC is within a range from 100% to T1(%), and the engine 7 is actively assisted in the case in which the first motor 9 has excess available power irrespective of the size of the travel load and the handled load. At this time, depending on the conditions, the power of the first motor 9 is used for traveling or load-handling. In contrast, charging by the engine is not carried out.

In this manner, by actively using the first motor 9, the discharge amount for the battery 37 becomes large. Thus, it is possible to prevent the SOC of the battery 37 from becoming too high, and overcharging is thereby prevented.

Mode 2 includes control that is carried out in the case in which the battery SOC is within a range from T1(%) to S1(%), and the assistance of the engine 7 by the first motor 9 is carried out only in the case in which the load on the engine 7 becomes high. At this time, charging by the engine is not carried out.

Specifically, mode 2 includes control in which only the first motor 9 assists the engine 7 in the case in which the engine load becomes high due to a load-handling operation. In contrast, the second motor 11, which is for travel, is controlled irrespective of the engine load, and, for example, during low rotation, in which the fuel economy of the engine 7 is low, that is, during a low vehicle speed and the like, control is carried out in which the second motor 11 outputs power before the engine 7.

Mode 3-1 to mode 3-3 include control that is carried out in the case in which the battery SOC is within a range from S1(%) to T2(%). Mode 3-1 is carried out in the case in which the engine is in operation and the assistance of the engine 7 by the first motor 9 is not always necessary. Mode 3-2 is carried out in the case in which the engine 7 is in operation and the assistance of the engine 7 by the first motor 9 is necessary. Mode 3-3 is carried out while the engine 7 is stopped.

Mode 3-1 includes control that is carried out in the case in which the charge possibility evaluating section 64 has determined that there is an available excess in the output of the engine 7, and thus charging is possible. In this case, the first motor 9 does not assist the engine 7 and carries out charging by the charge amount that has been determined by the charge amount determining section 63. As will be described below, the engine 7 further supplies an amount of power that the first motor 9 should provide as assistance and an amount of power that is used for power generation by the first motor 9.

However, in the case in which the output of the engine 7 reaches the maximum output, as will be described below, the charge amount for the battery 37 is decreased.

Mode 3-2 includes control that is carried out in the case in which the charge possibility evaluating section 64 has determined that there is no available excess in the output of the engine 7 for supplying power that can be used for power generation by the first motor 9, and thus charging is not possible. In this case, because the load on the engine 7 is great, the first motor 9 supplies power to assist the engine 7. Thus, power generation, in which the power of the engine 7 is used by the first motor 9, is not carried out.

Mode 3-3 includes control that is carried out while the engine 7 is in an idling stop, and charging in which the power of the engine 7 is used by the first motor 9 cannot be carried out. In other words, mode 3-3 includes control that is carried out while the engine 7 is stopped in the case in which the forklift 1 is not carrying out a load-handling operation and the forklift 1 is stopped or traveling at a low speed by using only the second motor 11 in order to realize an improved fuel economy.

Mode 4-1 and mode 4-2 include control that is carried out in the case in which the battery SOC is within a range from T2(%) to T3(%), and is carried out with the object of improving fuel economy when specifications stipulate that the operation of the engine 7 is not to be stopped. Here, mode 4-1 is carried out in the case in which the engine 7 is in operation and the engine 7 does not always need to be assisted by the first motor 9, and mode 4-2 is carried out in the case in which the engine 7 is in operation and the engine 7 must be assisted by the first motor 9.

Mode 4-1 includes control that is carried out in the case in which the charge possibility evaluating section 64 has determined that there is an available excess in the output of the engine 7, and thus that charging is possible. In this case, the first motor 9 does not assist the engine 7, and carries out charging by the charge amount that has been determined by the charge amount determining section 63. As will be described below, the engine 7 further supplies an amount of power that the first motor 9 should provide as assistance and an amount of power that is used for power generation by the first motor 9.

However, because the charge amount differs from that of mode 3-1, in the case in which the output of the engine 7 reaches a maximum output, as will be described below, either the charge amount for the battery 37 is reduced or the engine 7 is assisted by the first motor 9.

Mode 4-2 includes control that is carried out in the case in which the charge possibility evaluating section 64 has determined that there is no available excess in the output of the engine 7 for supplying power that can be used for power generation by the first motor 9, and that charging is not possible. In this case, because the load on the engine 7 is high, the first motor 9 supplies power to assist the engine 7. Thereby, power generation, in which the output of the engine 7 is used by the first motor 9, cannot be carried out.

Mode 5 includes control that is carried out in the case in which the battery SOC is within a range from T3(%) to 0(%), and is an emergency mode control in which the forklift 1 is stopped and is not carrying out either traveling and load-handling. This mode is dedicated to the charging of the battery 37.

Here, as shown in FIG. 8, the size relationships between S1, S2, T1, T2, and T3, which are the values of the battery SOC, are 100(%)>T1>S1>S2>T2>T3>0(%).

As shown in FIG. 7, the charge correction amount calculating section 71 determines the charge power that is the correction amount for the engine power $P_{EG}$ and the first motor power $P_{M1}$, based on the engine power $P_{EG}$, the first motor power $P_{M1}$, and the second motor power $P_{M2}$, which have been input from the power distribution table section 61, the charge amount and the discharge amount for the battery 37, which have been input from the charge amount determining section 63, and the charge possibility signal, which has been input from the charge possibility evaluating section 64 (step S5 (the charge correction amount determining step)).

The charge correction amount calculating section 71 is provided with an overload limiting section 72 that prevents a reduction in the speed in the engine 7 due to a overload, a charge limiting section 73 that prevents overcharging of and excess current to the battery 37, and an assist amount limiting section 74 that maintains the overload of the first motor 9 and the consistency of the total output of the engine 7 and the first motor 9.

The overload limiting section 72 carries out control in which an overload state is avoided by lowering the charge amount for the battery 37 in the case in which an overload state occurs in the engine 7 while in the charging mode. An overload state is a state in which the load that must be accommodated by the engine 7, that is, the load that is the sum of the charge load and the traveling and load-handling loads, exceeds the maximum output of the engine 7.

Figure 10:
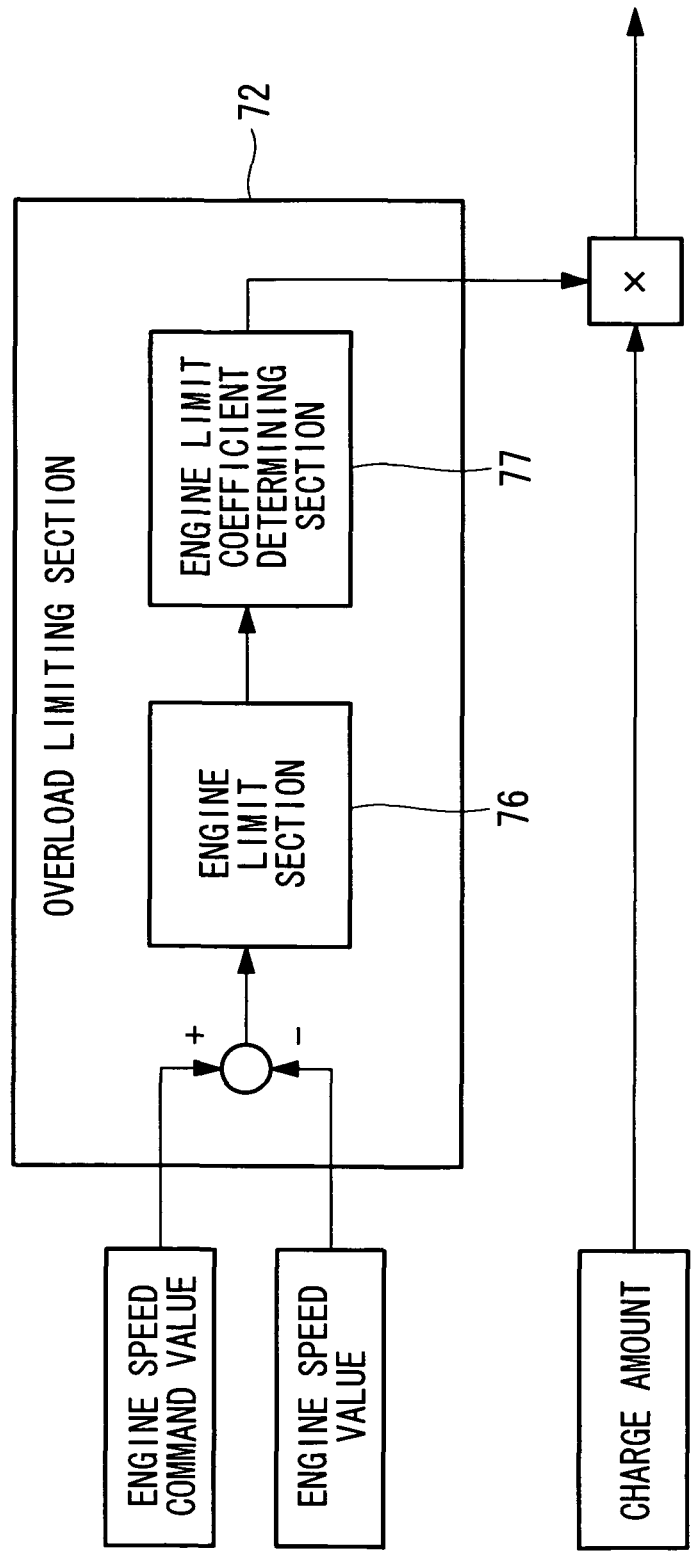
FIG. 10 is a block diagram for explaining the control in the overload limiting section in FIG. 7.

FIG. 10 is a block diagram for explaining the control in the overload limiting section in FIG. 7.

The speed command value for the engine 7 and the actual speed value of the engine 7 are input to the overload limiting section 72, and the difference between the command value and the speed value is calculated. The value of the calculated difference is input to an engine limiting section 76, and values smaller than 0 are eliminated. In other words, only values greater than or equal to 0 are forwarded.

The value of the difference that has been processed by the engine limiting section 76 is input to an engine limiting coefficient determining section 77.

Figure 11:
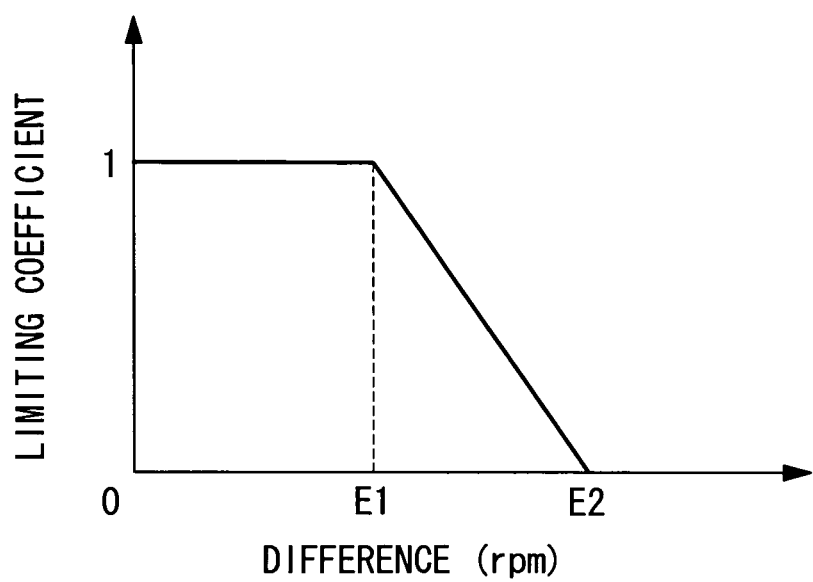
FIG. 11 is a drawing for explaining the table that is used in the determination of the limiting coefficient in the engine limiting coefficient determining section in FIG. 10.

FIG. 11 is a drawing for explaining the table that is used in the determination of the limiting coefficient by the engine limiting coefficient determining section 77 in FIG. 10.

The engine limiting coefficient determining section 77 determines whether or not an overload state has occurred in the engine 7 based on the difference between the speed command value for the engine 7 and the actual speed value of the engine 7, and at the same time, determines a coefficient that decreases the charge amount for the battery 37 in the case in which an overload state has occurred in the engine 7.

Specifically, as shown in FIG. 11, the engine limiting coefficient determining section 77 determines that an overload state is not occurring in the engine 7 when the difference (rpm) between the command value and the speed value is in a range from 0 to a predetermined value E1, and outputs a limiting coefficient of 1.

In contrast, when the difference (rpm) between the command value and the speed value exceeds the predetermined value E1, the engine limiting coefficient determining section 77 determines that an overload state has occurred in the engine 7, and reduces the value of the output limiting coefficient according to the difference in the values.

Furthermore, the engine limiting coefficient determining section 77 determines that the engine 7 is in a completely overloaded state when the difference (rpm) between the command value and the speed value has exceeded a predetermined value E2, and outputs a limiting coefficient 0.

The limiting coefficient that has been output from the engine limiting coefficient determining section 77 is multiplied by the charge amount that has been input from the charge amount determining section 63. In other words, the charge amount is reduced according to the load state of the engine 7.

The charge limiting section 73 limits the charge by the first motor 9 during regeneration that is carried out by the second motor 11, and prevents the overcharging of and excess current to the battery 37.

Figure 12:
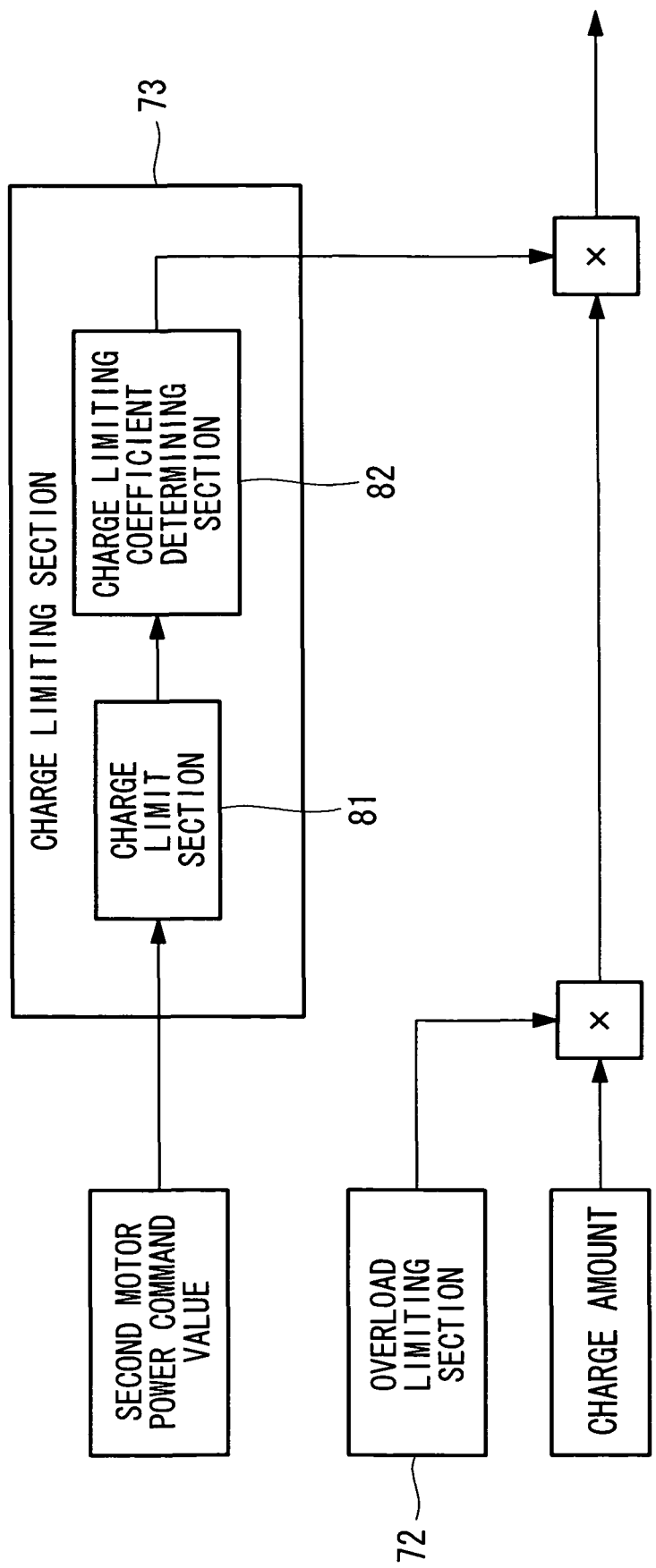
FIG. 12 is a block diagram for explaining the control in the charge limiting section in FIG. 7.

FIG. 12 is a block diagram for explaining the control in the charge limiting section in FIG. 7.

As shown in FIG. 12, in the charge limiting section 73, the power command value is input to the second motor 11 and the power charge value is input to the charge limit section 81. The charge limit section 81 eliminates the input values that are greater than 0, and the absolute value of the remaining negative values are output to the charge limiting coefficient determining section 82. In other words, among the power command values that have been input, only the command values that indicate regeneration are output to the charge limiting coefficient determining section 82.

Figure 13:
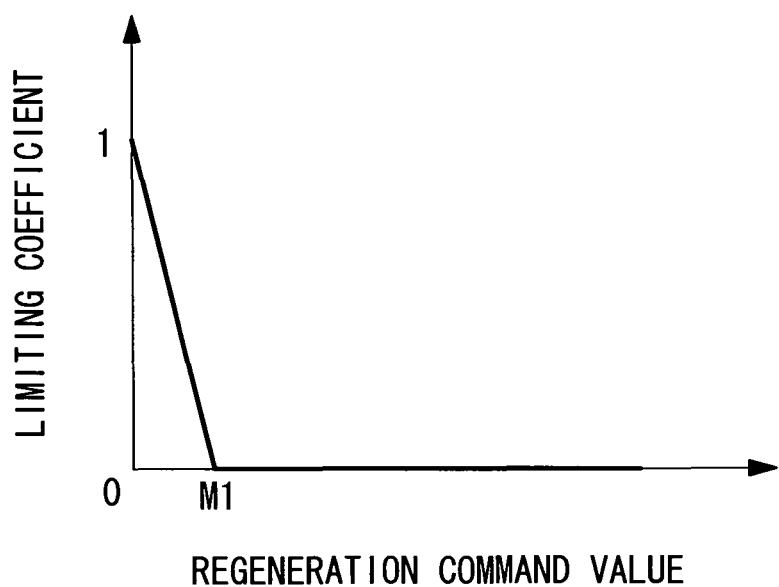
FIG. 13 is a drawing for explaining the table that is used in the determination of the limiting coefficient in the charge limiting coefficient determining section in FIG. 12.

FIG. 13 is a drawing for explaining the table that is used in determining the limiting coefficient by the charge limiting coefficient determining section in FIG. 12.

As shown in FIG. 13, when the regeneration command value is in a range from 0 to a predetermined value M1, the charge limiting coefficient determining section 82 reduces the value of the output limiting coefficient from 1 depending on the regeneration command value.

When the regeneration command value exceeds a predetermined value M1, it is determined that there is a high probability that an overcharging of or an excess current to the battery 37 may occur, and the limiting coefficient 0 is output.

The limiting coefficient that has been output from the charge limiting coefficient determining section 82 is multiplied by the charge amount that has been input from the charge amount determining section 63. In other words, the charge amount is reduced depending on the regeneration amount of the second motor 11.

Figure 14:
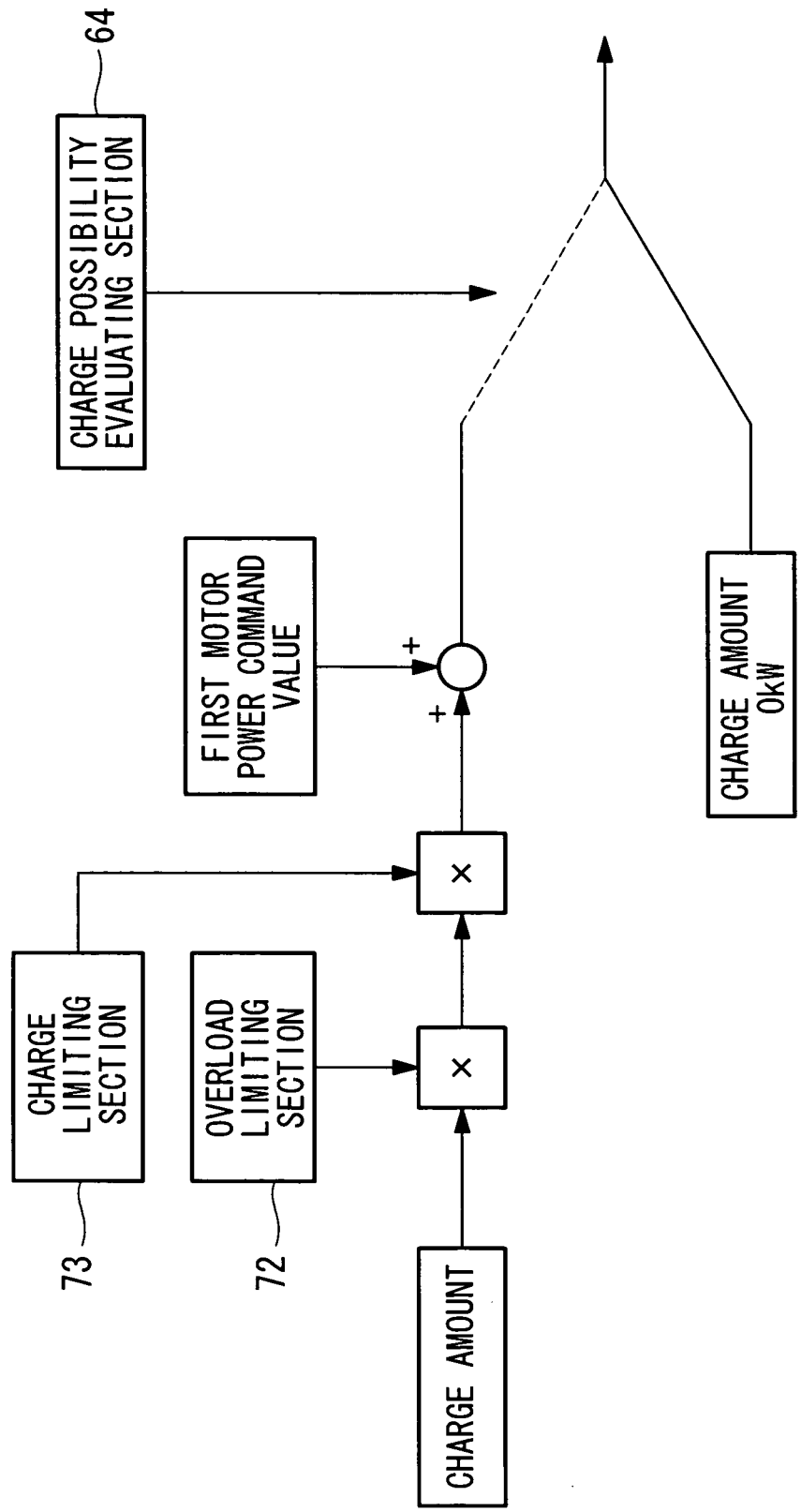
FIG. 14 is a block diagram for explaining the control of the charge amount based on the charge possibility determination in the charge correction amount determining section in FIG. 7.

FIG. 14 is a block diagram for explaining the control of the charge amount based on the charge possibility determination in the charge correction amount determining section in FIG. 7.

As shown in FIG. 14, after the charge amount that has been output from the charge amount determining section 63 has been multiplied by the limiting coefficients that have been output from the overload limiting section 72 and the charge limiting section 73, the first motor power command value is added.

Then, based on the charge possibility signal that has been output from the charge possibility evaluating section 64, one of either the charge amount to which the first motor power command value has been added or 0 kW is selected. That is, in the case in which charging is possible, the charge amount to which the first motor power command value has been added is output, and in the case in which the charging is not possible, a charge amount of 0 kW is output.

The assist amount limiting section 74 carries out control in which, in the case in which an overload state has occurred in the first motor 9 in the discharging mode, the overload state of the first motor 9 is avoided by reducing the discharge amount. Furthermore, the assist amount limiting section 74 maintains the consistency of the total output of the engine 7 and the first motor 9.

Figure 15:
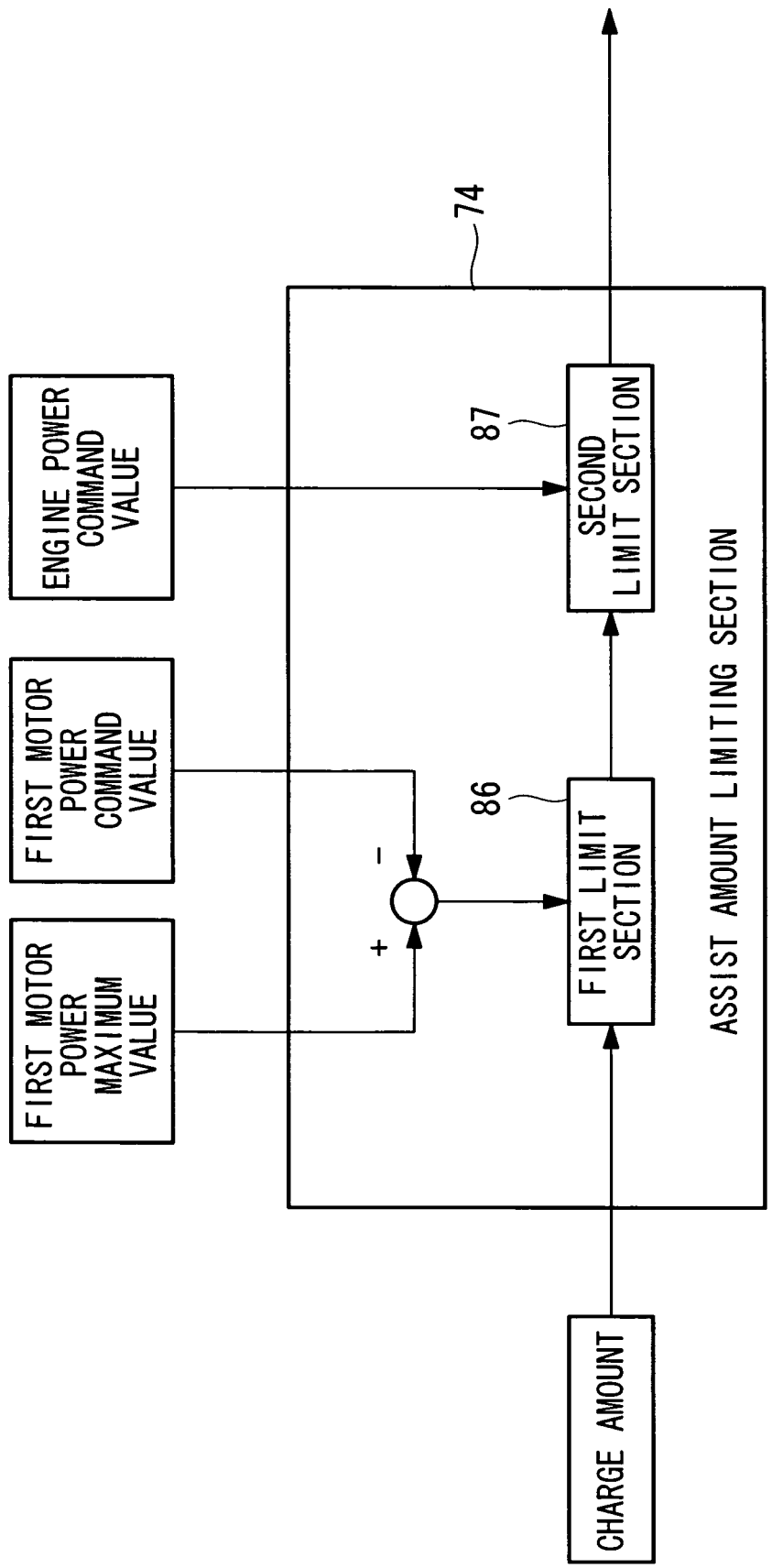
FIG. 15 is a block diagram for explaining the control in the assist amount limiting section in FIG. 7.

FIG. 15 is a block diagram for explaining the control in the assist amount limiting section in FIG. 7.

As shown in FIG. 15, the discharge amount that has been output from the charge amount determining section 63 and the value of the difference between the maximum output value of the first motor 9 and the power command value for the first motor 9, that is, the excess available power value of the output of the first motor 9, are input to a first limiting section 86 of the assist amount limiting section 74.

The first limiting section 86 uses the upper limit of the discharge amount that has been output as the excess available power value for the output of the first motor 9 to limit the discharge amount that has been output.

Furthermore, as shown in FIG. 15, the power command value that is input to the engine 7 is input to a second limiting section 87 of the assist amount limiting section 74. The second limiting section 87 limits the discharge amount that is output by using the upper limit of the discharge amount that is output as the power command value that is input to the engine 7.

By limiting the discharge amount in this manner, the discharge amount is limited so that the first motor 9 does not supply power that is equal to or greater than the power that the engine 7 would normally supply.

Figure 16:
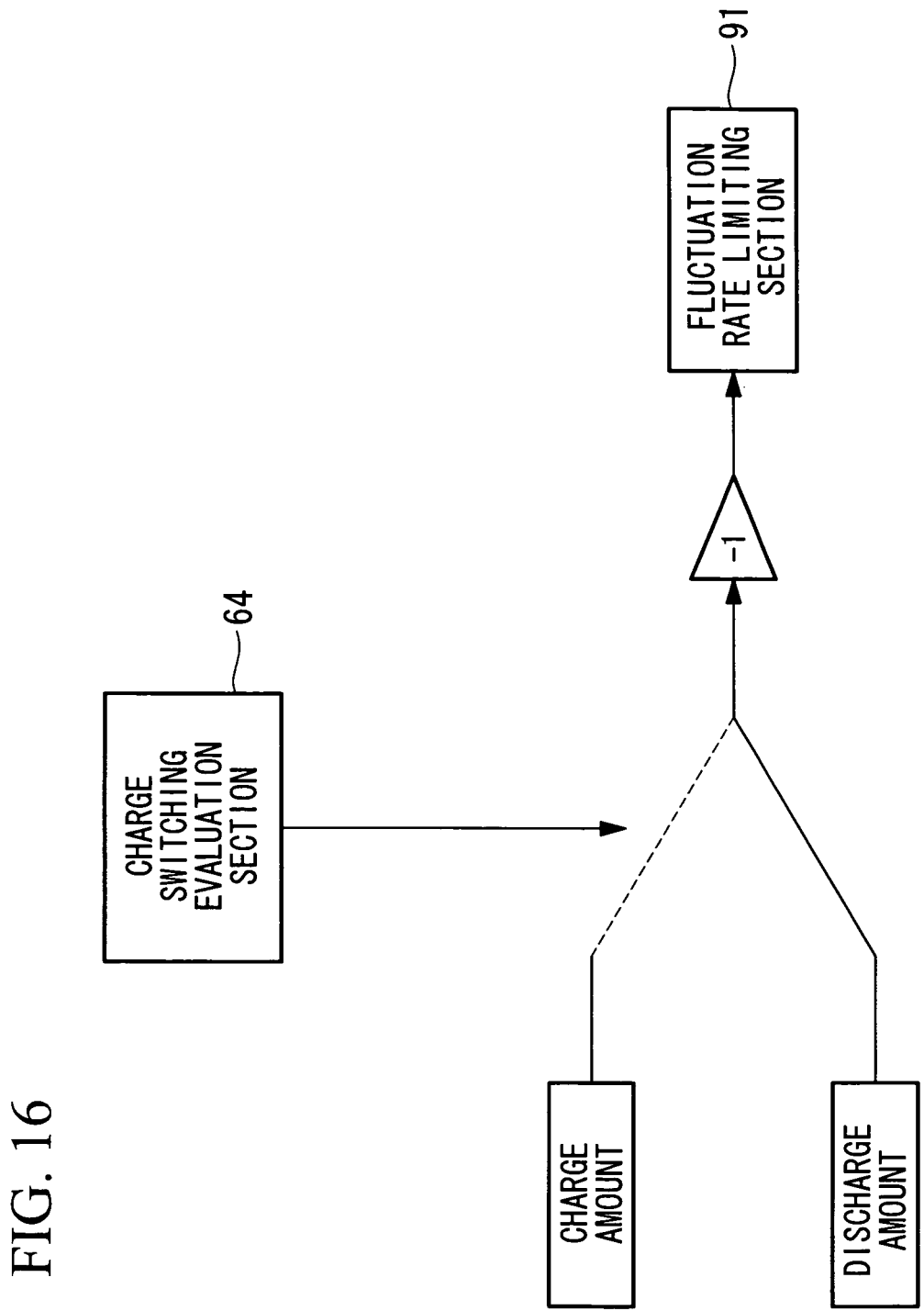
FIG. 16 is a block diagram for explaining the switching control between the charging mode and the discharging mode in the charge correction amount determining section in FIG. 7.

FIG. 16 is a block diagram for explaining the switching control for the charging mode and the discharging mode in the charge correction amount determining section in FIG. 7.

As described above, when the charge amount and the discharge amount are corrected, as shown in FIG. 16, either the charge amount or the discharge amount from the charge correction amount calculating section 71 is selected based on the switching signal that has been output from the charge switching evaluating section 62. That is, in the case of the charging mode, the charge amount is selected, and in the case of the discharging mode, the discharge amount is selected.

Before the charge amount or the discharge amount is output from the charge correction amount calculating section 71, they are respectively converted to a corresponding charge power and discharge power.

Note that this conversion may be carried out by the charge amount determining section 63 or may be carried out by the charge correction amount calculating section 71, and is not limited in particular. In the case in which the conversion described above is carried out by the charge amount correction section 63, the calculation within the charge correction amount calculating section 71 is also carried out by using values that have all been converted to corresponding powers.

As shown in FIG. 7, the charge amounts and the discharge amounts that have been output from the charge correction amount calculating section 71 are input to a fluctuation rate limiting section 91.

In the case in which the fluctuations of the charge power or the discharge power are rapid, shift shocks due to the rapid and sudden fluctuation are applied to the engine 7, the first motor 9, and related parts and the like that are influenced thereby, and the fluctuation rate limiting section 91 prevents damage thereto. In other words, the fluctuation rate limiting section 91 converts the fluctuation rates of the charge power and the discharge power to a moderated fluctuation, and protects the engine 7 and the first motor 9 and the like from damage.

As shown in FIG. 7, the charge power and the discharge power, for which the fluctuation rate has been converted to a moderated fluctuation rate by the fluctuation rate limiting section 91, are added to the engine power $P_{EG}$ that has been output from the power distribution table section 61 (step S6 (the addition step)), and the engine power $PA_{EG}$ after the addition thereof is output to the engine 7.

In contrast, the first motor power $P_{M1}$ that has been output from the power distribution table 61 has subtracted therefrom the converted charge amount or discharge amount, and the first motor power $PA_{M1}$ after this subtraction is output to the first motor 9.

Next, the operation of the forklift during traveling and load-handling will be explained.

When the forklift is traveling forward (i.e., when the selection of the FNR clutch 17 is F (forward)) and the travel power $P_R$ is smaller than a first predetermined power $P_1$, as shown in FIG. 1, the second motor power command is input to the second inverter 39, and the second motor power $P_{M2}$ is generated by the second motor 11. The second motor power $P_{M2}$ is input to the differential apparatus 21 via the second gear train 19. The second motor power $P_{M2}$ that has been input to the differential apparatus 21 is transferred to the front wheels 23, and serves as the forward drive power for the forklift 1.

In the case in which the travel power $P_R$ is between the first predetermined power $P_1$ and a second predetermined power $P_2$, the first motor power command is also input to the first inverter 35, and the first motor power $P_{M1}$ is generated by the first motor 9. The first motor power $P_{M1}$ is transferred in sequence from the first gear train 25 to the torque converter 15, the FNR clutch 17, the differential apparatus 21, and finally to the front wheels 23.

In the case in which the travel power $P_R$ is greater than a third predetermined power P3, the engine power command is also input to the engine 7, and engine power $P_{EG}$ is generated by the engine 7. The engine power $P_{EG}$ is transferred in sequence from the first gear train 25, to the torque converter 15, the FNR clutch 17, the differential apparatus 21, and finally to the front wheels 23.

When the forklift is traveling in reverse (i.e., when the selection of the FNR clutch 17 is R (reverse)), the only differences are that the rotation of the travel power $P_R$ and the first motor power $P_{M1}$ is reversed by the FNR clutch 17 and that the rotation of the second motor power $P_{M2}$, which is generated by the second motor 11, is reversed. The other aspects are substantially identical to the case of forward travel, and thus the explanations thereof will be omitted.

When the selection of the FNR clutch 17 is N (neutral) and the load-handling power $P_L$ is smaller than a fourth predetermined power $P_4$, the first motor power command is input to the first inverter 35, and the first motor power $P_{M1}$ is generated by the first motor 9. The first motor power $P_{M1}$ is transferred from the first gear train 25 to the hydraulic pump 29, and hydraulic pressure is generated by the hydraulic pump 29. The hydraulic cylinder (not illustrated) is driven by the generated hydraulic pressure to raise and lower the forks 33.

When the load-handling power $P_L$ is between the fourth predetermined power $P_4$ and a fifth predetermined power $P_5$, the engine power command is input to the engine 7 and the engine power $P_{EG}$ is generated by the engine 7. The engine power $P_{EG}$ is transferred in sequence from the first gear train 25 to the hydraulic pump 29.

Note that the first motor power $P_{M1}$ and the engine power $P_{EG}$ are transferred from the first gear train 25 to the torque converter 15, but transmission by the FNR clutch 17 is discontinued.

In addition, the second motor power command is input to the second inverter 39, and the second motor power $P_{M2}$ is generated by the second motor 11. The second motor power $P_{M2}$ is input to the differential apparatus 21 via the second gear train 19. The second motor power $P_{M2}$ that has been input to the differential apparatus 21 is transferred to the front wheels 23, and serves as the forward drive power for the forklift 1.

In addition, the transfer of second motor power $P_{M2}$ from the FNR clutch 17 to the torque converter 15 is discontinued.

In contrast, during a regeneration operation (i.e., during power regeneration), the rotation of the front wheels 23 is transferred to the second motor 11 via the differential apparatus 21, and the second motor 11 generates electric power by functioning as an electric power generator due to being driven. This generated power is accumulated in the battery 37 via the second inverter 39.

According to the structure that has been described above, the charge amount for the battery 37 can be appropriately set by the charge correction amount calculating section 71 calculating the charge power that is necessary in order for the first motor 9 to supply the charge amount that has been determined by the power distribution table section 61, and adding this charge power to the power that is supplied by the engine 7.

Furthermore, the switching between the charging mode and the discharging mode is carried out by the charge switching evaluating section 62 based on the traveling and load-handling states of the forklift 1, and thus the charge amount for the battery 37 can be appropriately set according to the operational states such as a travel state and a load-handling state.

The charge amount for the battery 37 is determined by the battery SOC calculating section 42 based on the SOC of the battery 37 that has been obtained by calculating the current that is charged to the battery 37 and the current that is discharged from the battery 37, and thus the charge amount of the battery 37 can be appropriately set.

Second Embodiment

Next, a second embodiment of the present invention will be explained with reference to FIG. 17 and FIG. 18.

The basic structure of the forklift of the present embodiment is identical to that of the first embodiment, and only the control in the charge correction amount determining section differs from that in the first embodiment. Thus, in the present embodiment, only the control in the charge correction amount determining section will be explained with reference to FIG. 17 and FIG. 18, and the explanation of the other aspects of the control and the like will be omitted.

Figure 17:
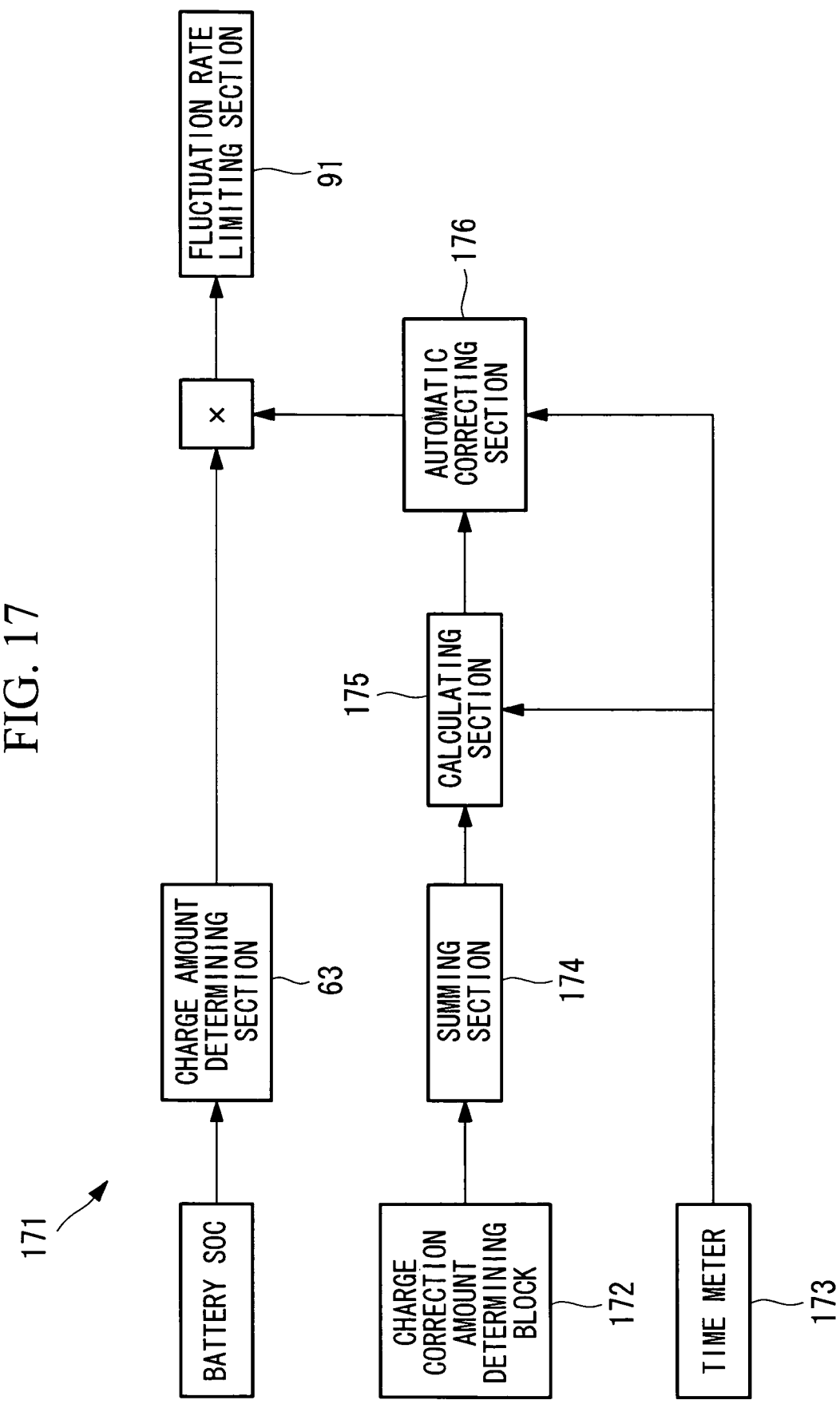
FIG. 17 is a block diagram for explaining the control in the charge correction amount determining section in a second embodiment of the present invention.

FIG. 17 is a block diagram for explaining the control in the charge correction amount determining section in the present embodiment.

Note that identical reference numerals are appended to structural elements that are identical to those of the first embodiment, and the explanations thereof will be omitted.

As shown in FIG. 17, the charge correction amount determining section 171 is provided with a charge correction amount determining block 172 that determines the charge correction amount, a time meter 173 that sums the operating time of the forklift 1, a summing section 174 that calculates the summed value of the charge correction amounts, an arithmetic section 175 that calculates the charge correction amount per unit operating time, and an automatic correcting section 176 that calculates the correction gain in the charge amount based on the results of the arithmetic section 175.

The charge correction amount determining block 172 calculates a charge correction amount that differs depending on each of the modes (the charge correction amount calculating step).

Specifically, in the case of mode 1, the charge correction amount ΔPeg for the engine power command and the charge correction amount ΔPm1 for the first motor power command are output according to the following equations:

$$\Delta PEG = -\Delta PM1, \Delta Pm1 = -Pbt$$

Here, Pbt denotes the battery charge power that has been calculated by the charge amount calculating section 63. In the discharging mode, this denotes the battery discharge power.

In the case of mode 2, the charge correction amount ΔPeg for the engine power command and the charge correction amount ΔPm1 for the first motor power command are output according to the following equations:

$$\Delta Peg = 0, \Delta Pm1 = 0$$

In the case of mode 3-1, the charge correction amount ΔPeg for the engine power command and the charge correction amount ΔPm1 for the first motor power command are output according to the following equations:

$$\Delta Peg = -\Delta Pm1, \Delta Pm1 = -(Pbt + Pm1)$$

That is, the power that the first motor 9 normally outputs, in other words, the power Pm1, which would assist the engine 7, is reduced, and the amount of charge Pbt is regenerated.

Here, Pm1 is the power command for the first motor 9, which has been calculated by the power distribution table section 61.

In the cases of mode 3-2 and mode 3-3, the charge correction amount ΔPeg for the engine power command and the charge correction amount ΔPm1 for the first motor power command are output according to the following equations:

$$\Delta Peg = 0, \Delta Pm1 = 0$$

In the case of mode 4-1, the charge correction amount ΔPeg for the engine power command and the charge correction amount ΔPm1 for the first motor power command are output according to the following equations:

$$\Delta Peg = -\Delta Pm1, \Delta Pm1 = -(Pbt + Pm1)$$

In the case of mode 4-2, the charge correction amount ΔPeg for the engine power command and the charge correction amount ΔPm1 for the first motor power command are output according to the following equations:

$$\Delta Peg = 0, \Delta Pm1 = 0$$

In the case of mode 5, the charge correction amount ΔPeg for the engine power command and the charge correction amount ΔPm1 for the first motor power command are output according to the following equations:

$$\Delta Peg = -\Delta Pm1, \Delta Pm1 = -(Pbt + Pm1)$$

The time meter 173 calculates the operating time of the forklift 1, that is, the summed value of the time during which at least one of or both of traveling and load-handling have been carried out.

As shown in FIG. 15, the summed value of the time meter is output to the arithmetic section 175 and the automatic correcting section 176.

The charge correction amount ΔPeg and the charge correction amount ΔPm1 that have been determined by the charge correction amount determining block 172 are input to the summing section 174, and the summed values of the charge correction amount ΔPeg and the charge correction amount ΔPm1 are calculated. The summed values of the charge correction amount ΔPeg and the charge correction amount ΔPm1 that have been calculated are output to the arithmetic section 175.

In the arithmetic section 175, the charge correction amount per unit time, which is the value obtained by dividing the input summed values by the total operating time, is calculated, and the calculated value is output to the automatic correcting section 176.

Figure 18:
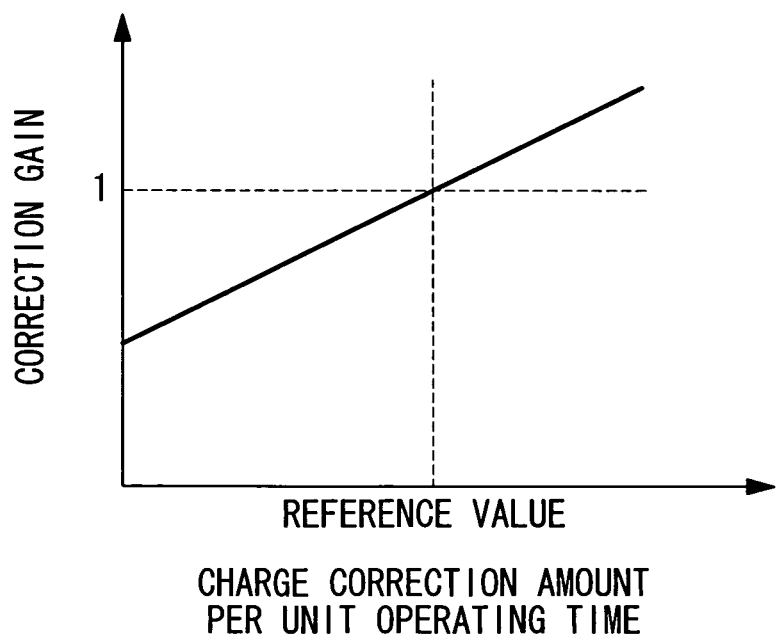
FIG. 18 is a diagram for explaining the table that is used in the calculation of the correction gain in the automatic correcting section in FIG. 17.

FIG. 18 is a drawing for explaining the table that is used in the calculation of the correction gain in the automatic correcting section in FIG. 17.

In the automatic correcting section 176, the correction gain is calculated based on the input charge correction amount per unit time and the table that is shown in FIG. 18. Specifically, in the case in which a reference value that has been set in advance and the charge correction value per unit time are equal, a correction gain of 1 is obtained. In the case in which the charge correction amount per time unit is less than the reference value, a correction gain that is less than 1 is obtained. In contrast, in the case in which the charge correction amount per time unit is greater than the reference value, a correction gain that is greater than 1 is obtained.

In other words, in the case of a manner of use of the forklift 1 in which the charge and discharge amounts for the battery 37 are low, a correction gain that is less than 1 is obtained, whereas in the case of a manner of use of the forklift 1 in which the charge and discharge amounts of the battery 37 are high, a correction gain that is greater than 1 is obtained.

The automatic correcting section 176 updates the value of the correction gain described above for the total operating time that has been input at predetermined intervals, and continues outputting the value of the correction gain that has been newly obtained until the next update time.

The correction gain that has been output by the automatic correcting section 176 is multiplied by the charge amount that has been output by the charge amount determining section 63, and is adjusted depending on the manner of use of the forklift 1 (the adjustment step).

The adjusted charge amount is output to the fluctuation rate limiting section 91. The processing after the fluctuation rate limiting section 91 is identical to that in the first embodiment, and thus the explanation thereof will be omitted.

According to the structure described above, by adjusting the charge amount based on the summed values of the operating times and the charge correction amounts, the charge amount for the battery 37 can be appropriately set.

Specifically, the frequency of the charging of the battery 37 is estimated by finding the charge correction value per unit time based on the operating time and the charge summed value. Thereby, the charge amount for the battery 37 can be appropriately set by adjusting the charge amount for the battery according to the estimated charge frequency.

In particular, when the charge amount for the battery 37 is large, the battery efficiency is reduced, and thus it is possible to prevent a reduction in the battery efficiency by appropriately setting the charge amount for the battery 37 so as to prevent an excessively large charge amount.

What is claimed is:

1. A control method for an industrial vehicle that comprises an engine that supplies power for at least traveling and load-handling, motors that supply power for at least one of said traveling and load-handling and carry out power generation, and a battery that supplies power to said motors or which is charged by the power that is generated by said motors, the control method comprising the steps of:
   estimating, by a processor, a charge rate of said battery by quantifying a current that is charged to said battery and a current that is discharged from said battery in an estimating step;
   determining, by the processor, a charge amount for said battery based on said estimated charge rate in a charge amount determining step;
   determining, by the processor, a charge power that is necessary for said motors to generate said determined charge amount as a correction amount for the power that is supplied by said engine in a power correction amount determining step; and
   adding, by the processor, said charge power to the supplied power of said engine that has been determined based on the state of said traveling and load-handling in an adding step,
   wherein the charge amount determining step further includes:
   carrying out charging by the engine by prioritizing an action of the industrial vehicle when the estimated charge rate is within a range from a first charge rate to a second charge rate lower than the first charge rate;
   carrying out charging by prioritizing charging by the engine when the estimated charge rate is within a range from the second charge rate to a third charge rate lower than the second charge rate; and
   carrying out charging while the industrial vehicle is stopped and is not carrying out either traveling and load-handling when the estimated charge rate is lower than the third charge rate.

2. A control method for an industrial vehicle that comprises an engine that supplies power for at least traveling and load-handling, motors that supply power for at least one of said traveling and load-handling and carry out power generation, and a battery that supplies power to said motors or which is charged by the power that is generated by said motors, the control method comprising the steps of:
   estimating, by a processor, a charge rate of said battery by quantifying a current that is charged to said battery or a current that is discharged from said battery in an estimating step; and
   determining, by the processor, a charge amount of said battery based on said estimated charge rate in a charge amount determining step;
   carrying out, by the processor, switching between a charging mode that prioritizes the charging of the battery and a discharging mode that prioritizes the power supply to at least one of said traveling and load-handling based on the charge rate of the battery in a switching step,
   wherein the charge amount determining step further includes:
   carrying out charging by the engine by prioritizing an action of the industrial vehicle when the estimated charge rate is within a range from a first charge rate to a second charge rate lower than the first charge rate;
   carrying out charging by prioritizing charging by the engine when the estimated charge rate is within a range from the second charge rate to a third charge rate lower than the second charge rate; and carrying out charging while the industrial vehicle is stopped and is not carrying out either traveling and load-handling when the estimated charge rate is lower than the third charge rate.

3. A control method for an industrial vehicle that comprises an engine that supplies power for at least traveling and load-handling, motors that supply power for at least one of said traveling and load-handling and carry out power generation, and a battery that supplies power to said motors or which is charged by the power that is generated by said motors, the control method comprising the steps of:

estimating, by a processor, a charge rate of said battery by quantifying a current that is charged to said battery or a current that is discharged from said battery in an estimating step;

determining, by the processor, a charge amount for said battery based on said estimated charge rate in a determining step;

calculating, by the processor, a plurality of charge correction amounts of said charge amount based on the state of said traveling and load-handling in a charge correction amount calculating step; and adjusting, by the processor, said charge amount by using a correction gain calculated on the basis of a charge correction amount per unit time obtained based on an operating time and a summed value in which the plurality of charge correction amounts are summed, wherein the operating time is a summed time during which either one or both of said traveling and load-handling is carried out, and wherein the charge correction amounts are summed to the summed value.

4. An industrial vehicle, comprising:

an engine that supplies power for at least one of traveling and load-handling;

motors that supply power for at least one of traveling and load-handling and carry out power generation;

a battery that supplies power to said motors or is charged by the power that is generated by said motors; and a control section that carries out the control method according to claim 1.

5. The control method according to claim 4, wherein the charge amount determining step further includes:

carrying out charging by the engine by prioritizing an action of the industrial vehicle when the estimated charge rate is within a range from the first charge rate to a second charge rate lower than the first charge rate;

carrying out charging by prioritizing charging by the engine when the estimated charge rate is within a range from the second charge rate to a third charge rate lower than the second charge rate; and carrying out charging while the industrial vehicle is stopped and is not carrying out either travelling and load-handling when the estimated charge rate is lower than the third charge rate.

\* \* \* \* \*